United States Patent
Xiong et al.

(10) Patent No.: US 12,267,875 B2
(45) Date of Patent: *Apr. 1, 2025

(54) METHOD AND APPARATUS FOR RESOURCE DETERMINATION, RESOURCE CONFIGURATION, TRANSMITTING RANDOM ACCESS PREAMBLE AND RANDOM ACCESS

(71) Applicant: Samsung Electronics Co., Ltd, Suwon-si (KR)

(72) Inventors: Qi Xiong, Beijing (CN); Chen Qian, Beijing (CN); Bin Yu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,160

(22) Filed: Jul. 13, 2023

(65) Prior Publication Data
US 2024/0049294 A1 Feb. 8, 2024

Related U.S. Application Data

(63) Continuation of application No. 17/444,512, filed on Aug. 5, 2021, now Pat. No. 11,706,817, which is a
(Continued)

(30) Foreign Application Priority Data

Sep. 8, 2017 (CN) .......................... 201710807829.6
Sep. 11, 2017 (CN) .......................... 201710813778.8
(Continued)

(51) Int. Cl.
*H04W 74/0833* (2024.01)
*H04W 48/08* (2009.01)
(Continued)

(52) U.S. Cl.
CPC ....... *H04W 74/0833* (2013.01); *H04W 48/08* (2013.01); *H04W 72/0453* (2013.01); *H04W 72/23* (2023.01)

(58) Field of Classification Search
CPC ........................... H04B 7/0617; H04W 48/08; H04W 56/0015; H04W 72/0453; H04W 72/23;
(Continued)

(56) References Cited

U.S. PATENT DOCUMENTS

2011/0058572 A1  3/2011  Du et al.
2011/0235609 A1  9/2011  Ahn et al.
(Continued)

FOREIGN PATENT DOCUMENTS

CN  101772180 A  7/2010
CN  102378341 A  3/2012
(Continued)

OTHER PUBLICATIONS

Office Action dated Apr. 1, 2023, in connection with Chinese Patent Application No. CN201710807829.6, 14 pages.
(Continued)

*Primary Examiner* — Zhensheng Zhang

(57) ABSTRACT

The present disclosure relates to a pre-5th-Generation (5G) or 5G communication system to be provided for supporting higher data rates beyond 4th-Generation (4G) communication system such as long term evolution (LTE). The method for operating a terminal in a wireless communication system is provided. The method includes receiving, from a base station, configuration information of an initial active uplink bandwidth part (UL BWP) and corresponding random access resource; based on the configuration information of the initial active UL BWP and the corresponding random access resource, determining corresponding physical random access channel (PRACH) occasions; and performing
(Continued)

random access procedure based on the determined PRACH occasion.

16 Claims, 34 Drawing Sheets

Related U.S. Application Data continuation of application No. 16/719,864, filed on Dec. 18, 2019, now Pat. No. 11,089,633, which is a continuation of application No. PCT/KR2018/010463, filed on Sep. 7, 2018.

(30) Foreign Application Priority Data

Nov. 16, 2017 (CN) .......................... 201711140825.3
Nov. 20, 2017 (CN) .......................... 201711158524.3

(51) Int. Cl.
*H04W 72/0453* (2023.01)
*H04W 72/23* (2023.01)

(58) Field of Classification Search
CPC ................ H04W 74/006; H04W 74/0833; H04W 16/28
See application file for complete search history.

(56) References Cited

U.S. PATENT DOCUMENTS

| | | | |
|---|---|---|---|
| 2015/0189675 A1 | 7/2015 | Feuersaenger et al. | |
| 2015/0264588 A1 | 9/2015 | Li et al. | |
| 2016/0302235 A1 | 10/2016 | Hwang et al. | |
| 2016/0353486 A1* | 12/2016 | Xia | H04W 74/006 |
| 2017/0135135 A1 | 5/2017 | Pelletier et al. | |
| 2017/0251460 A1 | 8/2017 | Agiwal et al. | |
| 2018/0139778 A1* | 5/2018 | Chou | H04W 74/04 |
| 2019/0059112 A1 | 2/2019 | Ou et al. | |
| 2019/0274172 A1 | 9/2019 | Yoon et al. | |
| 2020/0068416 A1 | 2/2020 | Kang et al. | |

FOREIGN PATENT DOCUMENTS

| | | | | |
|---|---|---|---|---|
| CN | 102869112 A | | 1/2013 | |
| CN | 102917433 A | | 2/2013 | |
| CN | 103716895 A | | 4/2014 | |
| CN | 103999528 A | | 8/2014 | |
| CN | 106664691 A | | 5/2017 | |
| CN | 107231693 A | | 10/2017 | |
| CN | 107295653 A | | 10/2017 | |
| CN | 102447546 B | * | 5/2019 | ............. H04L 69/24 |
| EP | 3445123 A1 | | 2/2019 | |
| EP | 3636035 A1 | | 4/2020 | |
| GB | 2495693 A | | 4/2013 | |
| JP | 2010507322 A | | 3/2010 | |
| JP | WO2015098745 A1 | | 3/2017 | |
| WO | 2013111843 A1 | | 8/2013 | |
| WO | 2014075458 A1 | | 5/2014 | |
| WO | 2015165080 A1 | | 11/2015 | |
| WO | 2016167692 A1 | | 10/2016 | |
| WO | 2017166901 A1 | | 10/2017 | |
| WO | 2017167078 A1 | | 10/2017 | |
| WO | 2018203724 A1 | | 11/2018 | |

OTHER PUBLICATIONS

Office Action dated Apr. 25, 2023, in connection with Chinese Patent Application No. CN201711158524.3, 15 pages.
Office Action dated May 5, 2023, in connection with Chinese Patent Application No. CN201711140825.3, 12 pages.
ZTE, "Grant-based and grant-free multiple access for mMTC," R1-164268, 3GPP TSG RAN WG1 Meeting #85, Nanjing, China, May 23-27, 2016, 4 pages.
Motorola Mobility et al., "PUCCH resource allocation," 3GPP TSG RAN WG1 NR Ad-Hoc#3, R1-1716642, Nagoya, Japan, Sep. 18-21, 2017, 6 pages.
Huawei, et al., "Title: On PRACH resource indication and level determination during random access," R1-156446, 3GPP TSG RAN WG1 Meeting #83, Anaheim, USA, Nov. 15-22, 2015, 6 pages.
Ericsson, "PRACH resource configuration for MTC," R1-155038, 3GPP TSG RAN WG1 Meeting #82bis, Malmo, Sweden, Oct. 5-9, 2015, 5 pages.
International Search Report dated Dec. 17, 2018 in connection with International Patent Application No. PCT/KR2018/010463, 4 pages.
Written Opinion of the International Searching Authority dated Dec. 17, 2018 in connection with International Patent Application No. PCT/KR2018/010463, 7 pages.
ZTE, "Power control during random access procedure", 3GPP TSG RAN WG1 Meeting #90, Aug. 21-25, 2017, R1-1712066, 4 pages.
Huawei et al., "WF on SRS configuration details", 3GPP TSG RAN WG1 #90, Aug. 21-25, 2017, R1-1714957, 2 pages.
International Telecommunication Union, "IMT Traffic estimates beyond year 2020", Radiocommunication Study Groups, Oct. 21, 2014, 35 pages.
International Telecommunication Union, "Future technology trends of terrestrial IMT systems", Nov. 2014, 32 pages.
International Telecommunication Union, "IMT Vision—Framework and overall objectives of the future development of IMT for 2020 and beyond", Sep. 2015, 21 pages.
Supplementary Partial European Search Report in connection with European Application No. 18853714.6 dated Jun. 4, 2020, 17 pages.
LG Electronics, "Remaining details on wider bandwidth operation," R1-1710352, 3GPP TSG RAN WG1 Meeting Ad-Hoc, Qingdao, P.R. China, Jun. 27-30, 2017, 10 pages.
Supplementary European Search Report dated Sep. 11, 2020 in connection with European Patent Application No. 18853714, 13 pages.
European Patent Office, "European Search Report," dated Jun. 29, 2022, in connection with European Patent Application No. 22167597.8, 9 pages.
Examination Report dated Mar. 31, 2022, in connection Indian Application No. 202017015222, 6 pages.
Office Action issued Dec. 11, 2023, in connection with Chinese Patent Application No. CN201711158524.3, 23 pages.
Notice of Allowance issued Jan. 2, 2024, in connection with Chinese Patent Application No. CN201711140825.3, 8 pages.
NTT Docomo, Inc. (Rapporteur), "RAN WG's progress on NR WI in the June AH meeting 2017," 3GPP TSG-RAN WG2 #99, R2-1707772, Aug. 2017, Berlin, Germany, 57 pages.
Office Action issued May 1, 2024, in connection with Chinese Patent Application No. 201711158524.3, 29 pages.
Nokia Networks et al., "Random Access procedure for NB-IoT", R2-161526, 3GPP TSG-RAN WG2 Meeting #93, St. Julians, Malta, Feb. 15-19, 2016, 4 pages.
Nokia Networks et al., "Random Access procedure for NB-IoT", R1-160458, 3GPP TSG-RAN WG1 Meeting #84, St. Julian's, Malta, Feb. 15-19, 2016, 3 pages.
Nokia Networks, "Random Access procedure for NB-IoT", R1-160019, 3GPP TSG-RAN WG1 NB-IoT Adhoc, Budapest, Hungary, Jan. 18-20, 2016, 3 pages.

* cited by examiner

METHOD AND APPARATUS FOR RESOURCE DETERMINATION, RESOURCE CONFIGURATION, TRANSMITTING RANDOM ACCESS PREAMBLE AND RANDOM ACCESS

CROSS-REFERENCE TO RELATED APPLICATIONS

This application is a continuation of application Ser. No. 17/444,512 filed Aug. 5, 2021, now U.S. Pat. No. 11,706,817 issued Jul. 18, 2023, which is a continuation of application Ser. No. 16/719,864, filed Dec. 18, 2019, now U.S. Pat. No. 11,089,633 issued Aug. 10, 2021, which is a continuation of International Application No. PCT/KR2018/010463, filed on Sep. 7, 2018, which claims priority to Chinese Patent Application No. 201710807829.6 filed on Sep. 8, 2017, Chinese Patent Application No. 201710813778.8 filed on Sep. 11, 2017, Chinese Patent Application No. 201711140825.3 filed on Nov. 16, 2017 and Chinese Patent Application No. 201711158524.3 filed on Nov. 20, 2017, the disclosures of which are herein incorporated by reference in their entirety.

BACKGROUND

1. Field

The disclosure generally relates to the wireless communication system. More specifically, this disclosure relates to a method and apparatus for a resource determination, a resource configuration and a random access.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The rapid development of information industry, particularly the increasing demand from the mobile Internet and the Internet of Things (IoT), brings about unprecedented challenges in the future mobile communications technology. According to the ITU-R M.[IMT. BEYOND 2020. TRAFFIC] issued by the International Telecommunication Union (ITU), it can be expected that, by 2020, mobile services traffic will grow nearly 1,000 times as compared with that in 2010 (4G era), and the number of user device connections will also be over 17 billion, and with a vast number of IoT devices gradually expand into the mobile communication network, the number of connected devices will be even more astonishing. In response to this unprecedented challenge, the communications industry and academia have prepared for 2020s by launching an extensive study of the fifth-generation mobile communications technology (5G). Currently, in ITU-R M.[IMT.VISION] from ITU, the framework and overall objectives of the future 5G have been discussed, where the demands outlook, application scenarios and various important performance indexes of 5G have been described in detail. In terms of new demands in 5G, the ITU-R M.[IMT. FUTURE TECHNOLOGY TRENDS] from ITU provides information related to the 5G technology trends, which is intended to address prominent issues such as significant improvement on system throughput, consistency of the user experience, scalability to support IoT, time delay, energy efficiency, cost, network flexibility, support for emerging services and flexible spectrum utilization, etc.

The performance of random access directly influences the user's experience. In a conventional radio communication system, for example, in LTE and LTE-Advanced, the random access process has been applied in various scenarios, such as, establishing an initial link, cell handover, reestablishing an uplink link, reestablishing an RRC connection or more; moreover, in accordance with whether a subscriber exclusively occupies preamble sequence resources, the random access process is classified into: contention-based random access and contention-free random access. Since, for the contention-based random access, each user equipment selects a preamble sequence from same preamble sequence resources when trying to establish an uplink, there may be a case in which multiple user equipment's select and transmit a same preamble sequence to a network equipment. Therefore, the collision resolution mechanism becomes an important research direction in the random access. How to reduce the collision probability and how to quickly solve a collision that has occurred are key indicators influencing the random access performance.

The contention-based random access process in LTE-A includes four steps, as shown in FIG. 5. In the first step, the user equipment (UE) randomly selects one preamble sequence from a preamble sequence resource pool and transmits the selected preamble sequence to the network equipment; and the network equipment performs correlation detection on the received signal to identify the preamble sequence transmitted by the UE. In the second step, the network equipment transmits a Random Access Response (RAR) to the UE, the RAR containing a random access preamble sequence identifier, a timing advance instruction determined according to a estimation of a time delay between the UE and the network equipment, a Temporary Cell-Radio Network Temporary Identifier (TC-RNTI), and time-frequency resources allocated for the UE to perform uplink transmission next time. In the third step, the UE transmits a Message 3 (MSg3) to the network equipment according to information in the RAR, the MSg3 containing information such as a UE t identifier and an RRC link request, wherein the UE identifier is an identifier that is unique to a user and used for resolving collision. In the fourth step, the network equipment transmits a collision resolution identifier to the UE, the collision resolution identifier containing an identifier corresponding to a UE who wins in the collision resolution. The UE upgrades TC-RNTI to Cell-Radio Network Temporary Identifier (C-RNTI) upon detecting its own identifier and transmits an Acknowledgement (ACK) signal to the network equipment to complete the random access process and wait for the scheduling of the base station. Otherwise, the UE will start a new random access process after a certain delay.

For a contention-free random access process, since the network equipment has already known the identifier of the UE, it can allocate a preamble sequence to the UE. Thus, when transmitting a preamble sequence, the UE does not need to randomly select a sequence, and instead, it will use the allocated preamble sequence. Upon detecting the allocated preamble sequence, the network equipment will transmit a corresponding RAR, the RAR including information such as timing advance and uplink resource allocation. Upon receiving the RAR, the UE considers that the uplink synchronization has been completed, and waits for the further scheduling of the network equipment. Therefore, the contention-free random access process contains only two steps: a first step of transmitting a preamble sequence, and a second step of transmitting an RAR.

The random access process in LTE is applicable for the following scenarios:
 1. initial access under RRC IDLE;
 2. reestablishment of RRC connection;
 3. cell handover;
 4. in an RRC connected state, the downlink data arrives and a random access process is requested (when the uplink is nonsynchronous);
 5. in an RRC connected state, the uplink data arrives and a random access process is requested (when the uplink is nonsynchronous or no source is allocated for a scheduling request in a PUCCH resource); and
 6. positioning.

In the LTE, the above six scenarios use the same random access steps.

Before the random access process, a UE needs to determine available random access resources; however, in a new communication system, the bandwidth is divided into one or more different Bandwidth Parts (BWPs). Therefore, how a UE determines an available random access resource for random access becomes a problem for those skilled in the art.

With the rapid development of information industry, especially the increasing demand from mobile internet and internet of things (IOT), it will bring unprecedented challenges to the future mobile communication technology. For example, compared with the 4G era in 2010, according to the ITU-R M. [IMT.BEYOND 2020.TRAFFIC] report of the international telecommunication union (ITU), it can be anticipated that by 2020, the amount of mobile services will increase by nearly 1,000 more than the 4G era in 2010, and the number of user equipment connections will also exceed 17 billion. As massive IOT devices gradually penetrate into the mobile communication network, the number of connected devices will be more astonishing. In order to meet this unprecedented challenge, the communication industry and academia have conducted extensive research on the fifth generation mobile communication technology (5G), which is oriented to the 2020s. At present, the framework and overall objectives of 5G in the ITU-R M. [IMT.VISION] report of the ITU have been discussed, in which the requirements outlook, application scenarios and various important performance indicators of 5G are described in detail. In view of the new requirements in 5G, the ITU-R M. [IMT.FUTURE TECHNOLOGY TRENDS] report of the ITU provides information about 5G's technical trends, aiming at solving the obvious problems of significant improvement of system throughput, consistency of user experience, scalability to support IOT time delay, energy efficiency, cost, network flexibility, support of emerging services and flexible spectrum utilization.

Compared with the existing LTE system, the system operated in high frequency band will be introduced into 5Gso as to improve the data transmitting efficiency and spectrum utilization rate of the system. In order to compensate significant path loss in high-band wireless channels, wireless communication systems operated in high-band need to adopt multi-beam operation, and the performance of the system can be improved by the beamforming gain generated by correct beam pairing. Therefore, for multi-beam systems, the accuracy of beam pairing will significantly affect the system performance.

For multi-beam operating system operated in high frequency band, the beam selection of initial access needs to be completed by searching for synchronization signal blocks. Specifically, there are multiple synchronization signal blocks in the system, and each synchronization signal block uses the same or different downlink transmit beams to transmit downlink signals. The terminal selects the appropriate synchronization signal block according to the reference signal received power (RSRP) of the synchronization signal block by adopting a preset criteria, and completes the downlink synchronization process.

Considering that in a 5G system, a downlink beam covers only a part of angles in a sector, the coverage requirements may be different in different downlink beam coverage areas, and the workload may also be different, so the required downlink transmit power may also be different. When different synchronization signal blocks use different transmit powers, it is necessary to inform the corresponding synchronization signal block of the corresponding transmit power in the system information, so that the terminal can compute the path loss, thus acquire the power for transmitting the random access preamble. The informing of each synchronization signal block of the corresponding transmitting in the system information will costa larger overhead.

How to inform the transmit power of random access preamble with a less overhead is an urgent problem to be solved in the prior art.

In the prior art, the terminal computes the path loss according to the preset base station transmit power and the measured reference signal receiving power, and determines the transmit power of the random access preamble. For a multi-beam operating system in 5G, because the coverage requirements in different beam coverage areas are different, even for different beam coverage areas in the same sector, the transmit power requirements of downlink synchronization signal blocks are different. At this time, still using a single downlink transmit power will not meet the power transmitting requirements in different beam coverage areas in the cell, resulting in power waste.

In LTE, the above six scenarios use the same random access steps. In future communication systems, the base station may still successfully decode multiple users (i.e., successfully receives the Msg3 of the multiple users) when the transmission of Msg3 of multiple users collides, due to the using of beamforming systems or other reasons. In the traditional LTE communication system, the base station will transmit a contention resolution message for only one user;

while in the new system, if the base station can already have decoded multiple users, that is, it has the ability to enable multiple users access to the system, there should have the technology to support to avoid limiting access to only one user by transmitting a contention resolution message for only one user; in particular, the using of beamforming systems will increase the probability of decoding multiple conflicting Msg3s, it need more effectively enable the user to complete the random access.

SUMMARY

Embodiments of the present disclosure provide a method and an apparatus for a resource determination, a resource configuration and a random access.

Embodiments of the present disclosure provide a method and an apparatus to solve at least one of the above technical detects, particularly the technical defect that it is unable to realize random access.

In one embodiment, a resource determination method is provided. The resource determination method includes steps of:
- acquiring configuration information of an initial active uplink bandwidth part (UL BWP) and corresponding random access resource configuration information;
- based on the configuration information of the initial active UL BWP and the configuration information of the random access resource, determining the corresponding PRACH occasions; and
- performing random access procedure based on the determined PRACH occasions.

In another embodiment, a resource configuration method is provided. The resource configuration method includes steps of:
- configuring an initial active UL BWP and a corresponding random access resource; and
- transmitting, to a User Equipment (UE), configuration information of the initial active UL BWP and the corresponding random access resource configuration information for the UE to perform random access procedure.

In yet another embodiment, a network equipment is provided. The network equipment includes:
- a configuring module configured to configure an initial active UL BWP and a corresponding random access resource; and
- a transmitting module configured to transmit, to a UE, configuration information of the initial active UL BWP and the corresponding random access resource configuration information for the UE to perform random access procedure.

In yet another embodiment a user equipment is provided. The user equipment includes:
- an acquiring module configured to acquire configuration information of an initial active UL BWP and corresponding random access resource configuration information;
- a determining module configured to determine, based on the configuration information of the initial active UL BWP and the configuration information of the random access resource, the corresponding PRACH occasions; and
- an access module configured to perform random access procedure based on the determined PRACH occasions.

In yet another embodiment, a network equipment is provided. The network equipment includes:
- a processor; and
- a memory configured to store machine-readable instructions which, when executed by the processor, enable the processor to execute the resource configuration method described above.

In yet another embodiment, a user equipment is provided. The user equipment includes:
- a processor; and
- a memory configured to store machine-readable instructions which, when executed by the processor, enable the processor to execute the resource determination method described above.

In yet another embodiment, a method for transmitting a random access preamble is provided. The method comprises:
- detecting a synchronization signal block to obtain a reference signal receiving power;
- determining a target synchronization signal block according to the reference signal receiving power, and acquiring configuration information carried in the target synchronization signal block;
- determining a random access channel and a random access preamble according to the configuration information, and determining the transmit power of the random access preamble according to the configuration information and the reference signal receiving power; and
- transmitting the random access preamble on the random access channel according to the transmit power.

Preferably, the step of determining a target synchronization signal block according to the reference signal receiving power comprises:
- selecting a synchronization signal block corresponding to the reference signal receiving power with the largest value among the reference signal receiving powers as a target synchronization signal block; or,
- selecting synchronization signal blocks corresponding to multiple reference signal receiving powers higher than a first preset threshold among the reference signal receiving powers, and randomly selecting one synchronization signal block as a target synchronization signal block with an the same probability among the selected synchronization signal blocks; selecting a synchronization signal block corresponding to the reference signal receiving power with the largest value as a target synchronization signal block, if there is no reference signal receiving power higher than the first preset threshold in the reference signal receiving powers.

Preferably, the step of determining a target synchronization signal block according to the reference signal receiving power comprises:
- computing the path loss of each synchronization signal block according to each of the reference signal receiving powers and the transmit power indicated in the configuration information carried in the corresponding synchronization signal block, and selecting the target synchronization signal block according to the path loss.

Preferably, the step of selecting the target synchronization signal block according to the path loss comprises:
- selecting the synchronization signal block with the smallest path loss as the target synchronization signal block; or,
- selecting synchronization signal blocks corresponding to multiple path losses lower than a second preset threshold among the path losses, and randomly selecting one synchronization signal block as a target synchronization signal block with the same probability among the selected synchronization signal blocks; and selecting the synchronization signal block with the smallest path loss as the target synchronization signal block, if there is no path loss lower than the second preset threshold among the path losses.

Preferably, the configuration information is power configuration information, and the step of determining the transmit power of the random access preamble according to the configuration information and the reference signal receiving power comprises:
  determining the transmit power of the target synchronization signal block according to the power configuration information;
  computing the path loss of the target synchronization signal block according to the transmit power of the target synchronization signal block and the reference signal receiving power; and
  computing to obtain the transmit power of the random access preamble according to the power configuration information and the path loss of the target synchronization signal block.

Preferably, the step of determining the transmit power according to the power configuration information comprises any one of the following ways:
  acquiring the transmit power of the target synchronization signal block; and
  determining the transmit power according to a reference transmit power and power fluctuation parameters.

Preferably, the step of acquiring the transmit power of the target synchronization signal block comprises:
  acquiring quantized transmit powers carried in the power configuration information; or,
  acquiring first index information of the target synchronization signal block carried in the power configuration information; and checking a transmit power mapping list according to first index information, and acquiring the transmit power corresponding to the first index information.

Preferably, the step of acquiring the transmit power of the target synchronization signal block comprises:
  acquiring a power configuration parameter sequence contained in the power configuration information; wherein the power configuration parameter sequence is a sequence composed of transmit power information corresponding to each synchronization signal block group in the current power group; and determining the transmit power according to the index information of the target synchronization signal block and the power configuration parameter sequence.

Preferably, the step of acquiring the transmit power of the target synchronization signal block comprises:
  acquiring number of power groups contained in the power configuration information, synchronization signal block index information in each power group, a synchronization signal block index sequence and transmit power configuration information corresponding to each power group; wherein one power group consists of multiple synchronization signal blocks, and the transmit power configuration information of all synchronization signal blocks in each power group is the same; the synchronization signal block index sequence is a sequence composed of index information of multiple synchronization signal blocks with the same transmit power;
  selecting a power group matched with the target synchronization signal block according to the index information of the target synchronization signal block, the synchronization signal block index information in each power group and the synchronization signal block index sequence; and
  determining the transmit power according to the transmit power configuration information corresponding to the selected power group.

Preferably, if number of synchronization signal blocks in each power group is different, the power configuration information further includes the number of synchronization signal blocks in each power group.

Preferably, the step of acquiring the transmit power of the target synchronization signal block comprises:
  acquiring number of power groups contained in the power configuration information, index information of synchronization signal block groups in each power group and transmit power configuration information corresponding to each synchronization signal block group in each power group; wherein one power group consists of multiple synchronization signal block groups, and the transmit power configuration information of all synchronization signal blocks in each synchronization signal block group of each power group is the same; and
  selecting synchronization signal block groups in the power groups matched with the target synchronization signal block according to the index information of the target synchronization signal block and the synchronization signal block group index information in each power group; and
  determining the transmit power according to the transmit power configuration information corresponding to the selected synchronization signal block group.

Preferably, the step of acquiring the transmit power of the target synchronization signal block comprises:
  acquiring transmit power configuration information corresponding to a power group contained in the power configuration information; wherein one power group consists of multiple synchronization signal block groups, and the transmit power configuration information of all synchronization signal blocks in each synchronization signal block group of each power group is the same; and
  determining the transmit power configuration information corresponding to the power group as the transmit power of the target synchronization information block.

Preferably, the step of determining the transmit power according to a reference transmit power and power fluctuation parameters comprises:
  acquiring a quantized reference transmit power and second index information carried in the power configuration information;
  checking a power fluctuation parameter mapping list according to the second index information, and acquiring the power fluctuation parameters corresponding to the second index information; and
  computing and acquiring the transmit power of the target synchronization signal block according to the quantized reference transmit power and the power fluctuation parameters.

Preferably, the step of determining the transmit power according to a reference transmit power and power fluctuation parameters comprises:

acquiring a quantized reference emission power and quantized power fluctuation parameters carried in the power configuration information; and computing and acquiring the transmit power of the target synchronization signal block according to the quantized reference transmit power and the quantized power fluctuation parameters.

Preferably, the step of determining the transmit power according to a reference transmit power and power fluctuation parameters comprises:

acquiring second index information of the target synchronization signal block carried in the power configuration information;

checking a power fluctuation parameter mapping list according to the second index information, and acquiring the power fluctuation parameters corresponding to the second index information; and computing and acquiring the transmit power of the target synchronization signal block according to the preset reference transmit power and the power fluctuation parameters.

Preferably, the step of determining the transmit power according to a reference transmit power and power fluctuation parameters comprises:

acquiring preconfigured power fluctuation parameters and third index information carried in the power configuration information;

checking a reference transmit power mapping list according to the third index information, and acquiring the reference transmit power corresponding to the third index information; and computing and acquiring the transmit power of the target synchronization signal block according to the reference transmit power and the power fluctuation parameters.

Preferably, the step of determining the transmit power according to a reference transmit power and power fluctuation parameters comprises:

acquiring second index information and third index information carried in the power configuration information;

checking a power fluctuation parameter mapping list according to the second index information, and acquiring the power fluctuation parameters corresponding to the second index information; and checking a reference transmit power mapping list according to the third index information, and acquiring the reference transmit power corresponding to the third index information; and computing and acquiring the transmit power of the target synchronization signal block according to the reference transmit power and the power fluctuation parameters.

Preferably, the step of computing to obtain the transmit power of the random access preamble according to the power configuration information and the path loss of the target synchronization signal block comprises:

acquiring initial target preamble receiving power information in the power configuration information;

computing a target receiving power of a preamble according to the initial target preamble receiving power information; and computing to obtain the transmit power of the random access preamble according to the target receiving power and the path loss of the preamble.

Preferably, it also includes:

acquiring power control parameters carried in the power configuration information; and adjusting the preamble target receiving power or the transmit power of the random access preamble according to the power control parameters.

Preferably, the step of acquiring power control parameters carried in the power configuration information comprises:

acquiring power control parameters of the target synchronization signal block carried in the power configuration information; or, acquiring fourth index information of the target synchronization signal block carried in the power configuration information; and checking a power control parameter mapping list according to the fourth index information, and acquiring the power control parameters corresponding to the fourth index information.

In yet another embodiment, an apparatus for transmitting a random access preamble is provided. The apparatus comprises:

a detection unit configured to detect a synchronization signal block to obtain a reference signal receiving power;

a first processing unit configured to determine a target synchronization signal block according to the reference signal receiving power, and acquire configuration information carried in the target synchronization signal block;

a second processing unit configured to determine a random access channel and a random access preamble according to the configuration information, and determine the transmit power of the random access preamble according to the configuration information and the reference signal receiving power; and a transmit unit configured to transmit the random access preamble on the random access channel according to the transmit power.

In yet another embodiment, a random access method is provided. The method comprises:

transmitting random access response(s) (RAR(s)) to a plurality of UEs, based on received preambles transmitted by the plurality of UEs;

receiving Msg3(s) transmitted by the plurality of UEs; and transmitting a contention resolution message to the plurality of UEs, based on the received Msg3(s) transmitted by the plurality of UEs.

In yet another embodiment, another random access method is provided. The method comprises:

transmitting a Msg3 to a base station, based on received Random Access Response (RAR) corresponding to a transmitted preamble;

receiving a contention resolution message from the base station corresponding to the Msg3.

In yet another embodiment, a base station device is provided. The base station comprises:

a first transmitting module, configured to transmit random access response(s) (RAR(s)) to a plurality of UEs, based on the received preambles transmitted by the plurality of UEs;

a first receiving module, configured to receive Msg3(s) transmitted by the plurality of UEs; and a second transmitting module, configured to transmit a contention resolution message to the plurality of UEs based on the received Msg3 transmitted by the plurality of UEs.

In yet another embodiment, a user equipment is provided. The user equipment comprises:

a third transmitting module, configured to transmit a Msg3 to a base station based on received random access response corresponding to a transmitted preamble;

a second receiving module, configured to receive a contention resolution message from the base station corresponding to the Msg3.

In yet another embodiment, a method for operating a terminal in a wireless communication system is provided. The method includes receiving, from a base station, configuration information of an initial active uplink bandwidth part (UL BWP) and corresponding random access resource; based on the configuration information of the initial active UL BWP and the corresponding random access resource, determining corresponding physical random access channel (PRACH) occasions; and performing random access procedure based on the determined PRACH occasion.

In yet another embodiment, a method for operating a base station in a wireless communication system is provided. The method includes configuring an initial active uplink bandwidth part (UL BWP) and a corresponding random access resource; and transmitting, to a terminal, configuration information of the initial active UL BWP and the corresponding random access resource for the UE to perform random access procedure, wherein the configuration information of the initial active UL BWP and the corresponding random access resource is used to determine corresponding physical random access channel (PRACH) occasions.

In yet another embodiment, a method for operating a terminal in a wireless communication system is provided. The method includes detecting a synchronization signal block to obtain a reference signal receiving power; determining a target synchronization signal block according to the reference signal receiving power, and acquiring configuration information carried in the target synchronization signal block; determining a random access channel and a random access preamble according to the configuration information, and determining the transmit power of the random access preamble according to the configuration information and the reference signal receiving power; and transmitting, to a base station, the random access preamble on the random access channel according to the transmit power.

A method and an apparatus according to various embodiments of the present disclosure describe that in the resource determination method provided by the embodiments of the present disclosure, configuration information of an initial active UL BWP and corresponding random access resource configuration information are acquired, so that a prerequisite is provided for the subsequent determination of a corresponding PRACH for initial access based on the configuration information; and then, the corresponding PRACH occasions are determined based on the configuration information of the initial active UL BWP and the configuration information of the random access resource, so that a UE can find the position of the available PRACH occasion and then perform random access procedure based on the determined PRACH occasions. Accordingly, the UE can perform random access procedure based on the PRACH occasions so as to access to the network.

A method and an apparatus according to various embodiments of the present disclosure describe that in the resource configuration method provided by the embodiments of the present disclosure, an initial active UL BWP and a corresponding random access resource are configured, so that a prerequisite is provided for the subsequent transmission of configuration information of the initial active UL BWP and the corresponding random access resource to a UE; and then, configuration information of the initial active UL BWP and the corresponding random access resource are transmitted to the UE for the UE to perform random access procedure, so that information about a BWP used by initial access and the position information of a random access resource are informed to the user equipment. Accordingly, during the random access, the user equipment can timely acquire the configuration condition of the initial active UL BWP and the corresponding random access resource and thus access the network.

A method and an apparatus according to various embodiments of the present disclosure describe that compared with the prior art, the disclosure at least has the following advantages:

In the disclosure, by configuring the transmit power of the synchronization signal block and the preamble target receiving power, different of random access preamble transmit powers are configured for different synchronization signal blocks with a lower of overhead. By adopting the method provided by the disclosure, higher energy efficiency can be provided for the system, at the same time, the power of the terminal can be saved, the service life of the terminal can be prolonged, and the user experience can be improved.

The embodiment of the present disclosure provides a random access method. The random access method comprises: transmitting of random access response(s) (RAR(s)) to a plurality of UEs, based on received preambles transmitted by the plurality of UEs; receiving of Msg3(s) transmitted by the plurality of UEs, which provides necessary guarantees for subsequent transmitting of a contention resolution message to the plurality of UEs; and transmitting of a contention resolution message to the plurality of UEs, based on the Msg3 transmitted by the plurality of UEs. The method can enable the base station to transmit the contention resolution message to the plurality of different UEs at the same time. It provides a reliable guarantee for multiple users to access the base station and perform data transmission at the same time based on the received contention resolution message, and effectively avoids the situation that the base station transmits the contention resolution message to only one user and only one user is accessed thereto.

Additional aspects and advantages of the present disclosure will be set forth in part in the below description and become apparent from the description, or may be learned by practice of the disclosure.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
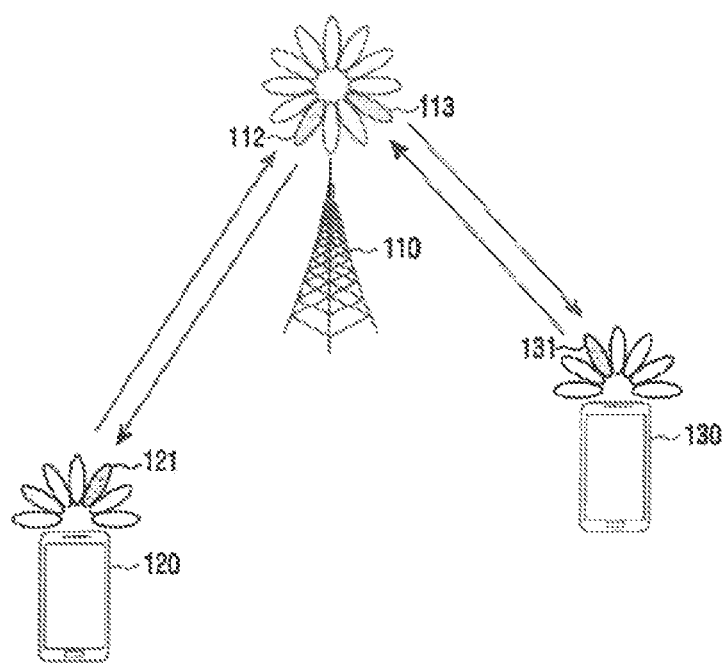
FIG. 1 illustrates a wireless communication system according to various embodiments of the present disclosure.
Figure 2:
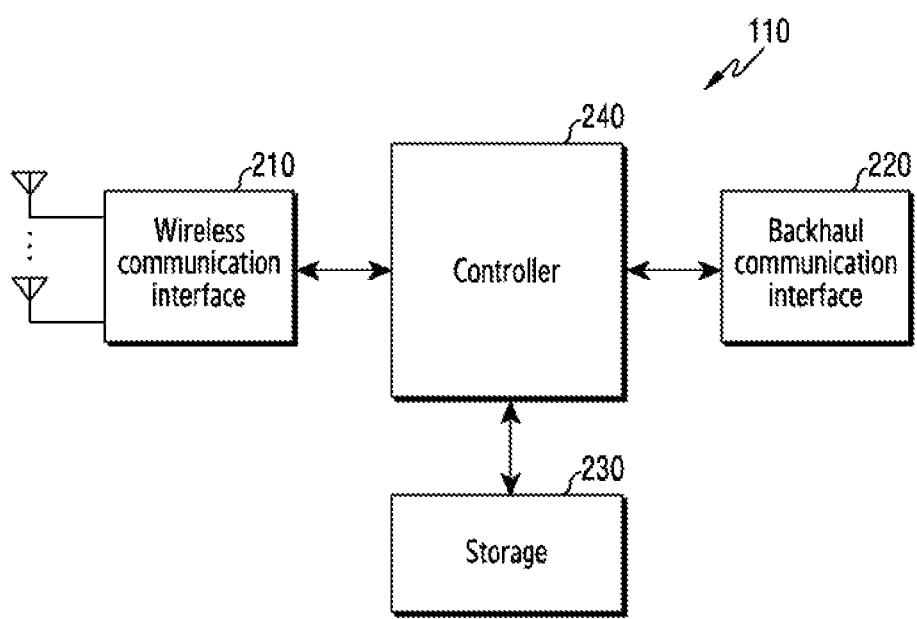
FIG. 2 illustrates the BS in the wireless communication system according to various embodiments of the present disclosure.
Figure 3:
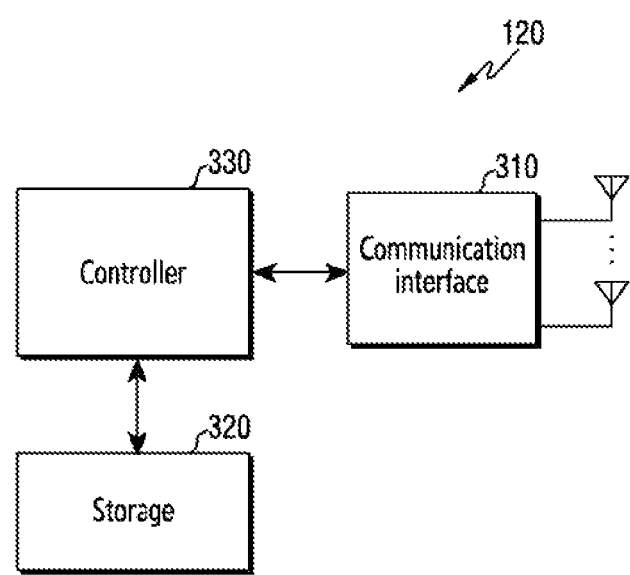
FIG. 3 illustrates the terminal in the wireless communication system according to various embodiments of the present disclosure.
Figure 4:
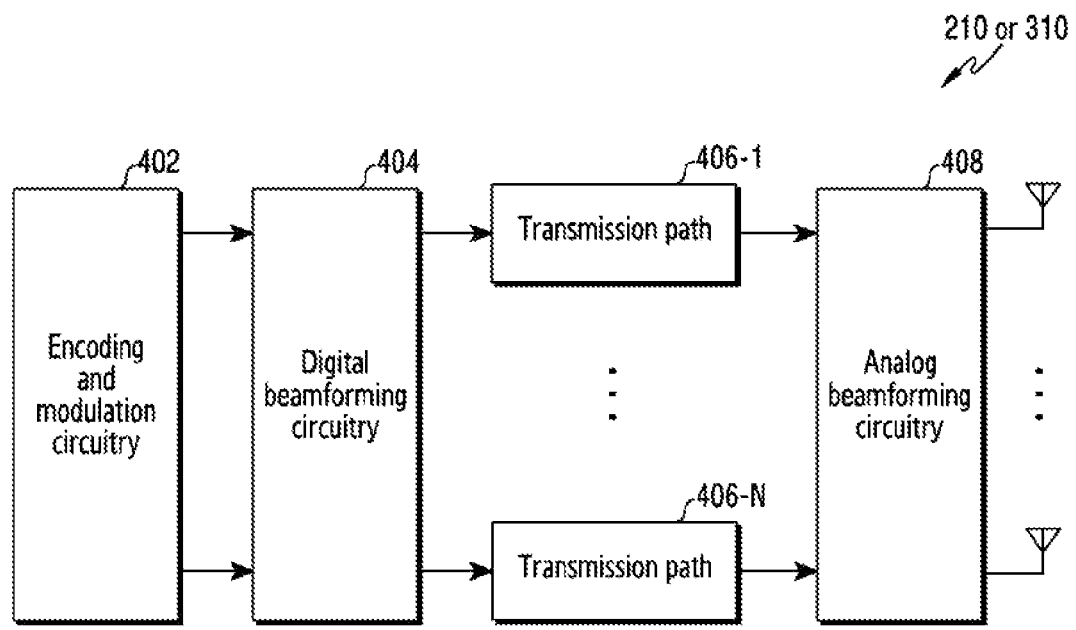
FIG. 4 illustrates the communication interface in the wireless communication system according to various embodiments of the present disclosure.

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skilled in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skilled in the art to which the present disclosure belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skilled in the art that term "terminal" and "terminal apparatus" as used herein compasses not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or without a multi-line display; Personal Communication Systems (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

In a new communication system, a network equipment (e.g., a base station or an access point equipment) will divide a bandwidth into one or more different bandwidth parts (BWPs). Therefore, during the initial access, the network equipment needs to inform a user equipment (UE) of information about a BWP used by initial access and the position information of a random access resource. Hence, how the network equipment informs a UE of the information about a BWP used by initial access and the position information of a random access resource so that the UE can determine the position information of the random access resource for initial access becomes a problem for those skilled in the art.

For a new system, there may be multiple available Uplink BWPs (UL BWPs). However, during the initial access, a UE does not acquire the configuration condition of the BWPs in this network and also does not acquire the configuration condition of random access resources in this network, so that the UE cannot access to this network. Therefore, a network equipment needs to inform the UE of the configuration condition of UL BWPs and random access resources. The network equipment jointly informs the UE of configuration information of the initial UL BWP and information about frequency-domain position of random access resources. Upon acquiring the configuration information of the initial UL BWP and the information about frequency-domain position of random access resources, the UE is able to find the position of the available random access resource.

Figure 6:
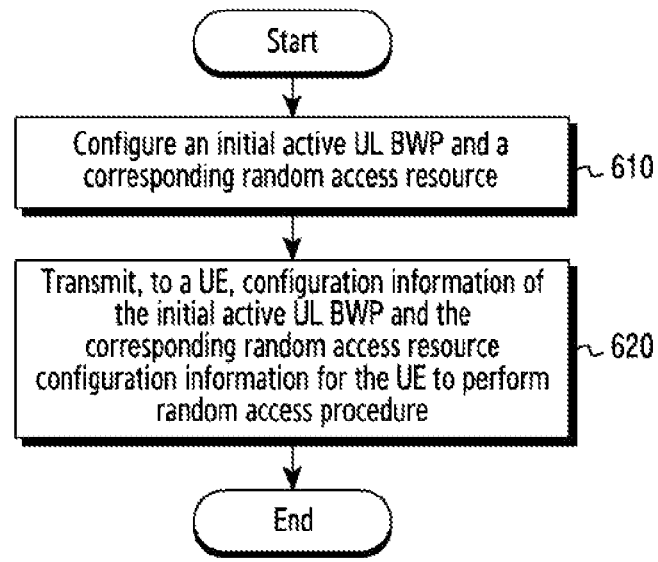
FIG. 6 illustrates a schematic flowchart of a resource configuration method according to various embodiments of the present disclosure.

Based on the above technical problem to be solved, an embodiment of the present disclosure provides a resource configuration method. Specifically, an embodiment of the present disclosure provides a resource configuration method, as shown in FIG. 6, including: step 610: configuring an initial active UL BWP and a corresponding random access resource; and step 620: transmitting, to a UE, configuration information of the initial active UL BWP and the corresponding random access resource configuration information for the UE to perform random access procedure.

In the resource configuration method provided by this embodiment of the present disclosure, an initial active UL BWP and a corresponding random access resource are configured, so that a prerequisite is provided for the subsequent transmission of configuration information of the initial active UL BWP and the corresponding random access resource to a UE; and then, configuration information of the initial active UL BWP and the corresponding random access resource are transmitted to the UE for the UE to perform random access procedure, so that information about the BWP used by initial access and the information about the position of the random access resource are informed to the UE. Accordingly, during the initial access, the UE can timely acquire the configuration condition of the initial active UL BWP and the corresponding random access resource and thus access to the network.

Preferably, the initial active UL BWP is configured by any one of the following ways: configuring indication information about a lowest numbered resource block of the initial active UL BWP and indication information about bandwidth of the initial active UL BWP; configuring indication information about the lowest numbered resource block of the initial active UL BWP; configuring indication information about the bandwidth of the initial active UL BWP; and, configuring an index for indicating the initial active UL BWP.

Preferably, the indication information about the lowest numbered resource block of the initial active UL BWP and/or the indication information about bandwidth of the initial active UL BWP are configured by any one of the following ways: configuring an index for indicating the lowest numbered resource block of the initial active UL BWP and/or and an index for indicating the bandwidth of the initial active UL BWP; and, configuring an index for simultaneously indicating a combination of the lowest numbered resource block of the initial active UL BWP and the bandwidth of the initial active UL BWP.

Preferably, the random access resource is configured by any one of the following ways: configuring indication information about a position of lowest PRACH transmission occasion in frequency domain and indication information about a frequency offset between adjacent PRACHs; configuring indication information about a position of lowest PRACH transmission occasion in frequency domain; and, configuring indication information about a frequency offset between adjacent PRACHs.

Preferably, the indication information about the position of lowest PRACH transmission occasion in frequency domain is configured by any one of the following ways: configuring indication information about a position of lowest PRACH transmission occasion in frequency domain and indication information about a frequency offset of the lowest PRACH transmission occasion in frequency domain with respect to the PRB 0 of the initial active UL BWP; configuring indication information about a position of lowest PRACH transmission occasion in frequency domain in the initial active UL BWP; and, configuring indication information about a position of lowest PRACH transmission occasion in frequency domain in a full frequency band.

Preferably, the position of the PRACH transmission occasion in frequency domain satisfies a symmetrical frequency-hopping rule.

Preferably, the resource configuration method further includes steps of: configuring a beam failure recovery request resource corresponding to the random access resource; and, transmitting, to the UE, configuration information of the beam failure recovery request resource corresponding to the random access resource.

Preferably, the beam failure recovery request resource corresponding to the random access resource is configured by at least one of the following ways: configuring indication information about a frequency offset between a frequency-domain ending position of a first beam failure recovery request resource and a frequency-domain ending position of the last PRACH; configuring indication information about a frequency offset between adjacent beam failure recovery request resources; and, configuring indication information about a frequency offset between any beam failure recovery request resource and a neighboring PRACH and indication information about a frequency offset between adjacent PRACHs.

Figure 7:
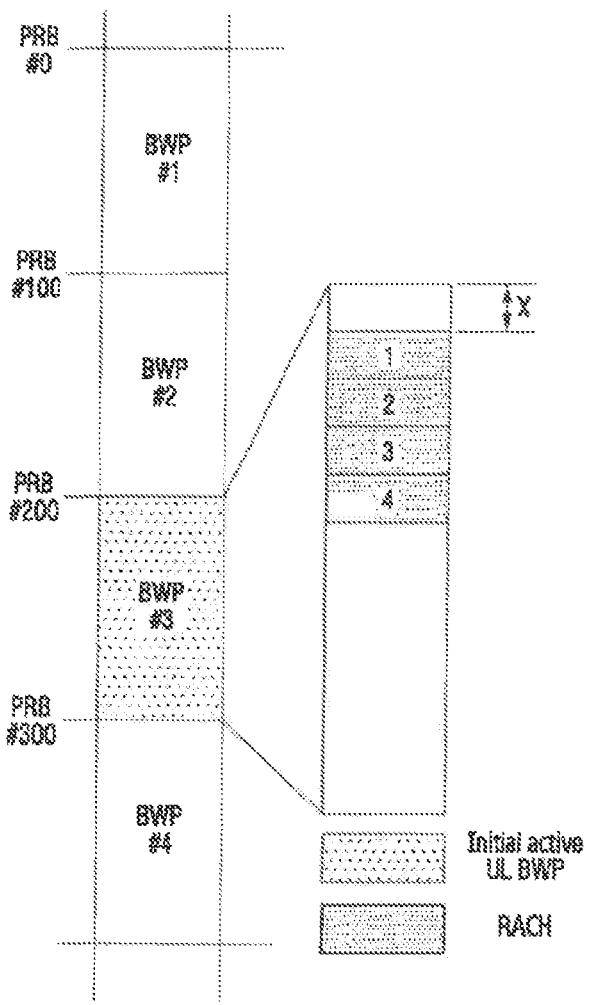
FIG. 7 illustrates a schematic diagram of indicating an initial active UL BWP and continuously arranged PRACHs according to various embodiments of the present disclosure.

Specifically, in this embodiment of the present disclosure, the network equipment will divide an available uplink frequency-domain resource into multiple different BWPs, and the BWPs are identified by absolute Physical Resource Block (PRB) index, as shown in FIG. 7. The first BWP is from PRB index 0 to PRB index 99; the second BWP is from PRB index 100 to PRB index 199; and so on. Wherein, the network equipment may pre-configure the number of PRBs occupied by each BWP, and the bandwidth occupied by each BWP (i.e., the number of occupied PRBs) may be different. During the initial access, since the UE has not accessed to the system, the UE has not acquired the bandwidth settings of the system, so that the UE is possibly not able to find an initial active UL BWP and also is possibly not able to determine the position of an available access resource in the system. Therefore, in this embodiment of the present disclosure, in the system information:

- the network equipment informs the UE of the lowest numbered resource block and bandwidth (the number of PRBs, bandwidth or more) of the initial active UL BWP;
- the network equipment informs the UE of the lowest numbered resource block of the initial active UL BWP, while the bandwidth of the initial active UL BWP is pre-configured;
- the network equipment informs the UE of the bandwidth of the initial active UL BWP, while the lowest numbered resource block of the initial active UL BWP is pre-configured;
- both the lowest numbered resource block of the initial active UL BWP and the bandwidth of the BWP are pre-configured.

Meanwhile, according to the configured lowest numbered resource block of the initial active UL BWP, the network equipment informs the UE of the frequency-domain position of a corresponding PRACH.

If PRACHs are arranged continuously, the network equipment informs the UE of a frequency offset of a lowest PRACH transmission occasion in frequency domain with respect to the PRB 0 of the initial active UL BWP.

If PRACHs are arranged discontinuously, the network equipment informs the UE of a frequency offset of the lowest PRACH transmission occasion in frequency domain with respect to with respect to PRB 0 of the initial active UL BWP and informs the UE of a frequency offset between two adjacent PRACHs.

The UE determines the position of the initial active UL BWP according to the configuration information of the initial active UL BWP acquired from the system information, and then determines a frequency-domain starting position of an available PRACH according to the configuration information of the PRACH.

Figure 8:
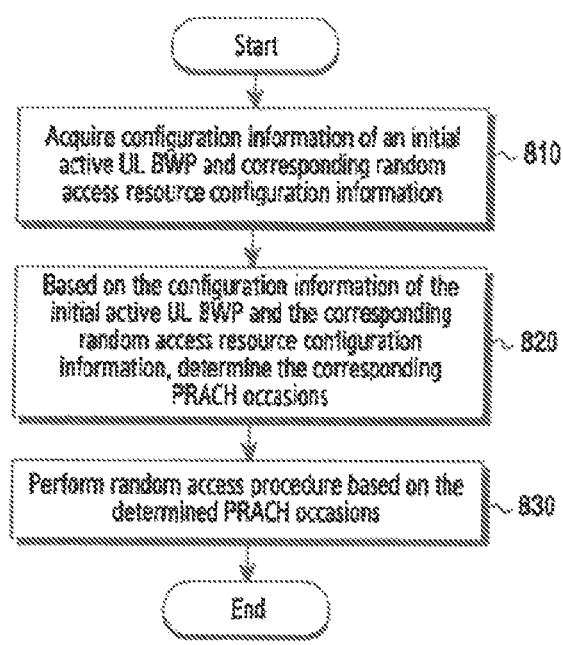
FIG. 8 illustrates a schematic flowchart of a resource determination method according to various embodiments of the present disclosure.

Another embodiment of the present disclosure provides a resource determination method, as shown in FIG. 8, including: step 810: acquiring configuration information of an initial active UL BWP and corresponding random access resource configuration information; step 820: determining, based on the configuration information of the initial active UL BWP and the configuration information of the random access resource, the corresponding PRACH occasions; and step 830: performing random access procedure based on the determined PRACH occasions.

In the resource determination method provided by this embodiment of the present disclosure, configuration information of an initial active UL BWP and corresponding random access resource configuration information are acquired, so that a prerequisite is provided for the subsequent determination of a corresponding PRACH for initial access based on the configuration information; and then, the corresponding PRACH occasions are determined based on the configuration information of the initial active UL BWP and the configuration information of the random access resource, so that a UE can find the position of the available PRACH occasion and then perform random access procedure based on the determined PRACH occasions. Accordingly, the UE can perform random access procedure based on this PRACH occasion so as to access to the network.

Preferably, the configuration information of the initial active UL BWP is acquired by any one of the following ways: receiving indication information about a lowest numbered resource block of the initial active UL BWP and indication information about bandwidth of the initial active UL BWP; receiving indication information about the lowest numbered resource block of the initial active UL BWP, and acquiring a pre-configured bandwidth of the initial active UL BWP; receiving indication information about the bandwidth of the initial active UL BWP, and acquiring a pre-configured lowest numbered resource block of the initial active UL BWP; acquiring the pre-configured lowest numbered resource block and bandwidth of the initial active UL BWP; and, receiving an index for indicating the initial active UL BWP.

Preferably, the indication information about the lowest numbered resource block of the initial active UL BWP and/or the indication information about bandwidth of the initial active UL BWP are received by any one of the following ways: receiving an index for indicating the lowest numbered resource block of the initial active UL BWP and/or an index for indicating the bandwidth of the initial active UL BWP; and, receiving an index for simultaneously indicating a combination of the lowest numbered resource block of the initial active UL BWP and the bandwidth of the initial active UL BWP.

Preferably, the configuration information of the random access resource is acquired by any one of the following ways: receiving indication information about a position of lowest PRACH transmission occasion in frequency domain and indication information about a frequency offset between adjacent PRACHs; receiving indication information about the position of lowest PRACH transmission occasion in frequency domain, and acquiring the pre-configured offset between adjacent PRACHs; acquiring the pre-configured position of lowest PRACH transmission occasion in frequency domain, and receiving indication information about the offset between adjacent PRACHs; and, acquiring the pre-configured position of lowest PRACH transmission occasion in frequency domain and the offset between adjacent PRACHs.

Preferably, the step of determining the corresponding PRACH occasions based on the configuration information comprises any one of the following: based on the lowest numbered resource block and bandwidth of the initial active UL BWP, the position of lowest PRACH transmission occasion in frequency domain and the offset between adjacent PRACHs, determining the corresponding PRACH occasions; based on the lowest numbered resource block and bandwidth of the initial active UL BWP and the position of lowest PRACH transmission occasion in frequency domain, determining the corresponding PRACH occasions; and, based on the lowest numbered resource block and bandwidth of the initial active UL BWP and the offset between adjacent PRACHs, determining the corresponding PRACH occasions.

Preferably, the indication information about the position of lowest PRACH transmission occasion in frequency domain is received by any one of the following ways: receiving indication information about a frequency offset of the lowest PRACH transmission occasion in frequency domain with respect to PRB 0 of the initial active UL BWP; and, receiving indication information about a position of lowest PRACH transmission occasion in frequency domain in the initial active UL BWP.

Preferably, the resource determination method further includes a step of: after the acquisition of the position of lowest PRACH transmission occasion in frequency domain, determining, according to a symmetrical frequency-hopping rule, frequency-domain positions of other PRACHs except for the first PRACH.

Preferably, the resource determination method further includes a step of: acquiring configuration information of a beam failure recovery request resource corresponding to the random access resource, and determining, based on the configuration information and/or the PRACH occasions, a corresponding beam failure recovery request resource.

Preferably, the configuration information of a beam failure recovery request resource corresponding to the random access resource is acquired by at least one of the following ways: receiving indication information about a frequency offset between a frequency-domain ending position of a first beam failure recovery request channel and a frequency-domain ending position of the last PRACH, and receiving indication information about a frequency offset between adjacent beam failure recovery request channels; acquiring a pre-configured frequency offset between the frequency-domain ending position of the first beam failure recovery request channel and the frequency-domain ending position of the last PRACH, and receiving indication information about the frequency offset between adjacent beam failure recovery request channels; receiving indication information about the frequency offset between the frequency-domain ending position of the first beam failure recovery request channel and the frequency-domain ending position of the last PRACH, and acquiring indication information about a pre-configured frequency offset between adjacent beam failure recovery request channels; acquiring indication information about a pre-configured frequency offset between the frequency-domain ending position of the first beam failure recovery request channel and the frequency-domain ending position of the last PRACH, and acquiring indication information about a pre-configured frequency offset between adjacent beam failure recovery request channels; receiving indication information about a frequency offset between any beam failure recovery request channel and a neighboring PRACH and indication information about a frequency offset between adjacent PRACHs; receiving indication information about a frequency offset between any beam failure recovery request channel and a neighboring PRACH, and acquiring indication information about a pre-configured frequency offset between adjacent PRACHs; acquiring indication information about a pre-configured frequency offset between any beam failure recovery request channel and a neighboring PRACH, and receiving indication information about the frequency offset between adjacent PRACHs; and, acquiring indication information about a pre-configured frequency offset between any beam failure recovery request channel and a neighboring PRACH and indication information about a frequency offset between adjacent PRACHs.

Preferably, the step of determining, based on the configuration information and the PRACH occasions, a corresponding beam failure recovery request resource includes any one of the following: according to the frequency offset between the frequency-domain ending position of the first beam failure recovery request channel and the frequency-domain ending position of the last PRACH as well as the frequency-domain ending position of the last PRACH, determining a first beam failure recovery request channel resource; and, according to the frequency offset between any beam failure recovery request channel and a corresponding PRACH and the frequency offset between adjacent PRACHs, determining any beam failure recovery request channel resource.

The embodiments of the present disclosure will be comprehensively described below by the following preferred implementations.

Embodiment 1

In Embodiment 1, description will be given on how a UE acquires, by configuration information of a network equipment, an initial active UL BWP and a frequency-domain position of an available PRACH. In the present disclosure, the frequency-domain position will be expressed by an index of a frequency-domain resource unit or one or more frequency-domain resource unit offset, wherein the frequency-domain resource unit may be a subcarrier, a subcarrier group, a PRB, a PRB group or more. For simplicity, in the description of Embodiment 1, the frequency-domain resource units are described as PRBs.

First, during the initial access, a UE may search Synchronization Signal (SS) block signals from a same cell, then find system information configured by a network equipment by successfully reading a broadcast message in the SS block, and acquire configuration information of an initial active UL BWP (i.e., receive configuration information of the initial active UL BWP in the system information), wherein A PRB index of the initial active UL BWP and the bandwidth of the BWP directly configured by the network equipment are read by the following specific ways:

The PRB index and the bandwidth are directly indicated by N bits. For example, the PRB index=200 of the lowest numbered resource block of the initial active UL BWP is configured by 9 bits in the system information, and the bandwidth indicated by the 9 bits is 100 PRBs, as shown in FIG. 7, that is, it is indicated that the initial active UL BWP starts from the 200th PRB of the uplink bandwidth of the whole system and occupies the bandwidth of 100 PRBs.

The UE receives indication information about the lowest numbered resource block of the initial active UL BWP from the network equipment, wherein the indication information is in the form of an index. An PRB index is directly indicated by N bits, or an N-bit index indicates multiple possible PRB indexes through a look-up table; and, the bandwidth is directly indicated by M bits, or indicated by an M-bit index through a look-up table. For example, four possible PRB indexes are indicated by N=2 bits. As shown in Table 1, possible PRB indexes indicated by the 2 bits are 0, 100, 200 and 300, respectively.

TABLE 1

Indication examples of the PRB index of the lowest numbered resource block of the initial active uplink BWP

| Bit value | PRB index of the lowest numbered resource block |
| --- | --- |
| 00 | 0 |
| 01 | 100 |
| 10 | 200 |
| 11 | 300 |

Similarly, four possible bandwidths are indicated by M=2 bits. As shown in table 2, possible bandwidths indicated by the 2 bits are 50 PRBs, 100 PRBs, 150 PRBs and 200 PRBs, respectively.

TABLE 2

Indication examples of the bandwidth of the initial active uplink BWP

| Bit value | Bandwidth (the number of PRBs) |
| --- | --- |
| 00 | 50 |
| 01 | 100 |
| 10 | 150 |
| 11 | 200 |

In addition, the PRB index of the lowest numbered resource block of the initial active UL BWP and the bandwidth occupied by frequency domain may also be jointly indicated by an N-bit index. As shown Table 3, four possible combinations of the PRB index and the bandwidth occupied by frequency domain are indicated by N=2 bits.

TABLE 3

Indication examples of the PRB index of the lowest numbered resource block of the initial active uplink BWP and the bandwidth of the frequency domain

| Bit value | PRB index of the lowest numbered resource block (the bandwidth of the frequency domain) |
| --- | --- |
| 00 | 0(50) |
| 01 | 100(100) |
| 10 | 200(150) |
| 11 | 300(200) |

Particularly, the PRB index of the lowest numbered resource block of the initial active UL BWP directly configured by the network is read, but the bandwidth of the initial active UL BWP is pre-configured. For example, the network equipment pre-configures the bandwidth of the initial active UL BWP as 100 PRBs, and the PRB index is informed by the above possible ways and will not be repeated here.

Particularly, the BWP of the initial active UL BWP directly configured by the network equipment is read, but the PRB index of the lowest numbered resource block of the initial active UL BWP is pre-configured by the network. For example, the network equipment pre-configures that the PRB index of the initial active UL BWP is counted from the 200th PRB, and the bandwidth (i.e., the number of the occupied PRBs) is informed by the above possible ways and will not be repeated here.

Particularly, both the PRB index and the bandwidth of the initial active UL BWP are pre-configured. For example, the PRB index of the lowest numbered resource block of the initial active UL BWP is pre-configured to be counted from the 200th PRB, and the bandwidth is pre-configured as 100 PRBs.

The index of the initial active UL BWP configured by the network equipment is read. In this case, the UE is informed of the configuration information (the starting PRB index and/or the corresponding BWP bandwidth) of all or part of possible UL BWPs in a pre-configured way or by using a system message, and each possible UL BWP corresponds to an index for the UL BWP. Meanwhile, in the system message, the UE may be informed of the index of the initial active UL BWP directly by an N-bit index or by an N-bit index through a look-up table. As shown in Table 4, BWP indexes of four possible initial active UL BWPs are informed by N=2 bits.

TABLE 4

Indication examples of the BWP index of the initial active uplink BWP

| Bit value | UL BWP index |
| --- | --- |
| 00 | 0 |
| 01 | 1 |
| 10 | 2 |
| 11 | 3 |

Upon acquiring the configuration information of the initial active UL BWP configured by the network equipment, the UE determines, according to the configuration information, the starting position and/or bandwidth of the initial active UL BWP. Therefore, according to the determined configuration of the initial active UL BWP and the configuration information of the random access resource informed in the system information, the frequency-domain positions of M (M>=1) available PRACHs are determined, and initial access is performed according to the PRACH at these frequency-domain positions, specifically including:

When the M PRACH occasions are continuous,
a pre-configured position of lowest PRACH transmission occasion in frequency domain is the Xth PRB or is X PRBs from the lowest numbered resource block of the initial active UL BWP.

X is a frequency offset from the lowest numbered resource block of the initial active UL BWP. For example, when X=2, it is indicated that the frequency-domain starting position of the first available random access channel has 2 PRBs away from the lowest numbered resource block of the initial active UL BWP.

Particularly, when X=0, it is indicated that the frequency-domain starting position of the first available PRACH is the lowest numbered resource block of the initial active UL BWP.

The UE receives a frequency offset of the lowest PRACH transmission occasion in frequency domain with respect to PRB 0 of the initial active UL BWP configured by the network equipment. The method for configuring the offset is shown in FIG. 7. For example, the network equipment configures that the first available PRACH has a frequency offset of 3 PRBs from the lowest numbered resource block of the initial active UL BWP, so that it is indicated that the frequency-domain starting position of the first available PRACH is after 3 PRBs from the lowest numbered resource block of the initial active UL BWP. Particularly, the offset may be directly indicated by N bits, or the offset may be indicated by N bits through a look-up table. The look-up table is the same as the above look-up table and will not be repeated here.

The UE reads the position of lowest PRACH transmission occasion in frequency domain in the initial active UL BWP configured by the network equipment, for example, the frequency-domain starting position is the Xth PRB of the initial active UL BWP. For example, the network equipment configures that the first available PRACH is at the third PRB of the initial active UL BWP. Particularly, the value of X may be directly indicated by N bits, or the value of X may be indicated by N bits through a look-up table. The look-up table is the same as the above look-up table and will not be repeated here.

The UE reads the position of lowest PRACH transmission occasion in frequency domain in a full frequency band configured by the network equipment, for example, the frequency-domain starting position is the Xth PRB of the full frequency band part. For example, the network equipment configures that the first available PRACH is at the 303rd PRB of the full frequency band part. Particularly, the value of X may be directly indicated by N bits, or the value of X may be indicated by N bits through a look-up table. The look-up table is the same as the above look-up table and will not be repeated here.

Figure 9:
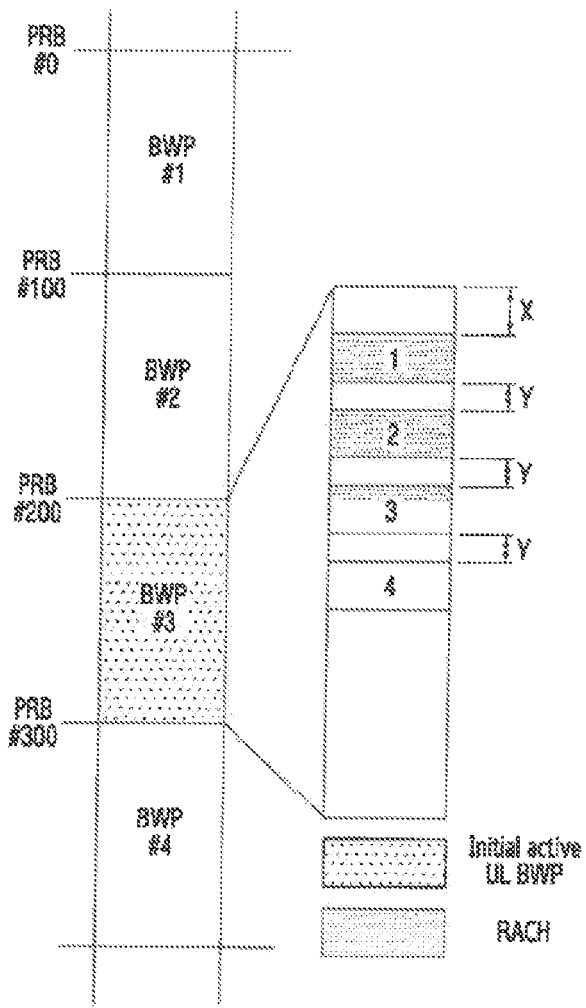
FIG. 9 illustrates a first exemplary diagram of confirmation of a frequency-domain position of an PRACH according to various embodiments of the present disclosure.

When the M PRACH occasions are discontinuous,
the network equipment configures or pre-configures that the position of lowest PRACH transmission occasion in frequency domain is the Xth PRB of the initial active UL BWP, or the Xth PRB of the full frequency band part, or away X PRBs from the lowest numbered resource block of the initial active UL BWP. For other PRACHs:

The UE reads a bandwidth interval of Y RPBs configured or pre-configured by the network equipment. As shown in FIG. 9, the UE finds the position of lowest PRACH transmission occasion in frequency domain by a pre-configured value of X, and then determines the positions of the remaining PRACHs according to the configured bandwidth interval Y between adjacent PRACHs. The value of Y may be directly informed by N bits or informed by N bits through a look-up table. The look-up table is similar to the above look-up table and will not be repeated here.

Figure 10:
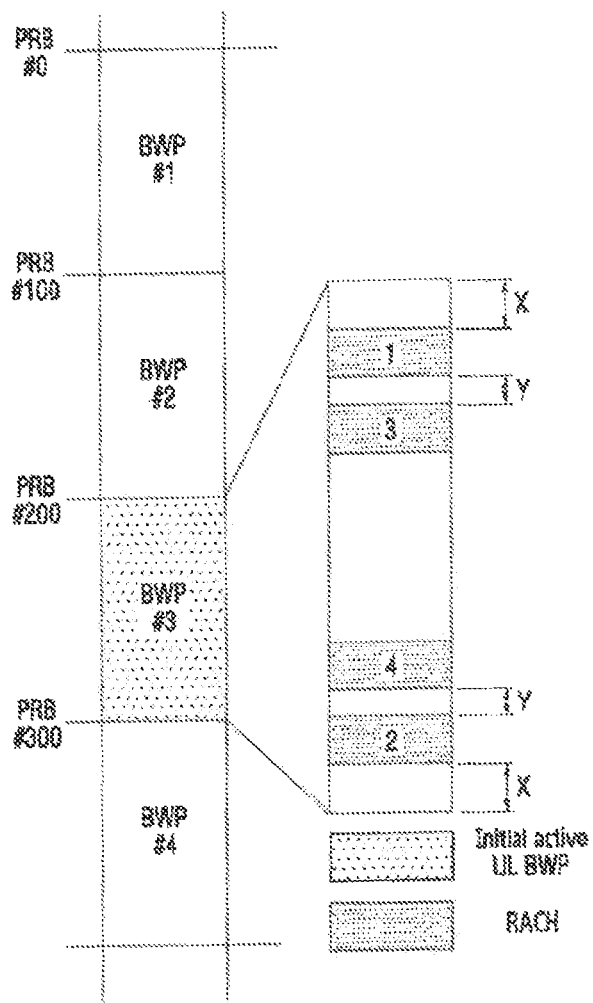
FIG. 10 illustrates a second exemplary diagram of confirmation of a frequency-domain position of an PRACH according to various embodiments of the present disclosure.

The UE determines, according to a symmetrical frequency-hopping rule configured by the network equipment, the frequency-domain positions of the remaining PRACHs, as shown in FIG. 10. After the UE determines the first PRACH, by using the central position of the initial active UL BWP as axis, the UE symmetrically finds a second PRACH. The frequency-domain ending position of this PRACH also has X PRBs away from the ending position of the initial active UL BWP. A starting position of a third PRACH has Y PRBs away from the ending position of the first PRACH. Similarly, a starting position of a fourth PRACH is also determined according to the frequency-hopping rule. Particularly, Y may be 0.

Figure 11:
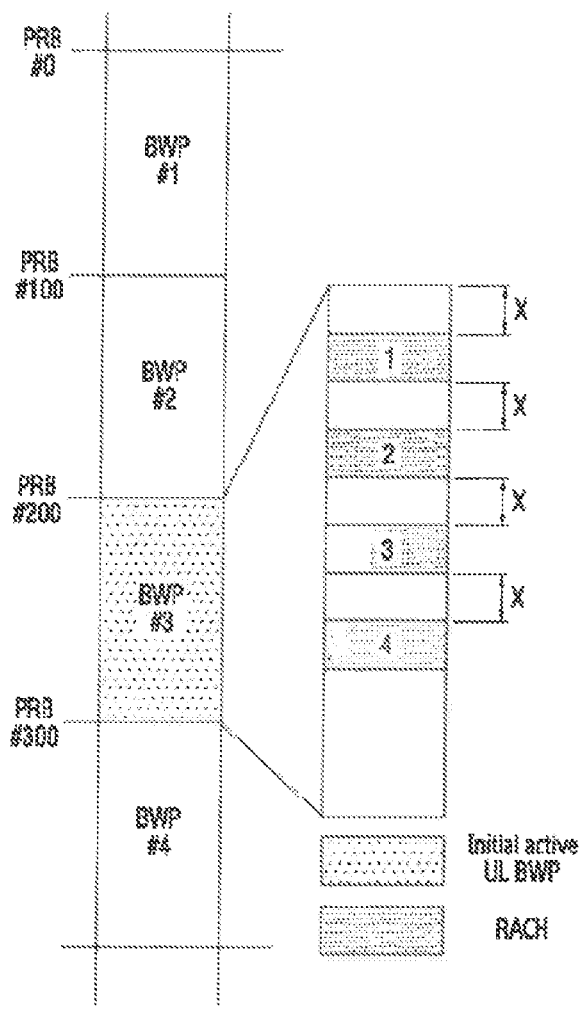
FIG. 11 illustrates a third exemplary diagram of confirmation of a frequency-domain position of an PRACH according to various embodiments of the present disclosure.

Particularly, the bandwidth interval in the frequency domain is pre-configured as X PRBs, or the network equipment configures the bandwidth interval in the frequency domain as X PRBs. That is, the first PRACH has X PRBs away from the lowest numbered resource block of the initial active UL BWP, and the offset between adjacent PRACHs in the frequency domain is also X PRBs, as shown in FIG. 11. Particularly, it is also possible to determine other PRACHs except for the first PRACH by the frequency-hopping rule. That is, after the UE determines the first PRACH, by using the central position of the initial active UL BWP as axis, the UE symmetrically finds a second PRACH, and the frequency-domain ending position of this PRACH also has X PRBs away from the ending position of the initial active UL BWP. A starting position of a third PRACH has Y PRBs away from the ending position of the first PRACH. Similarly, a starting position of a fourth PRACH is also determined according to the frequency-hopping rule.

Figure 12:
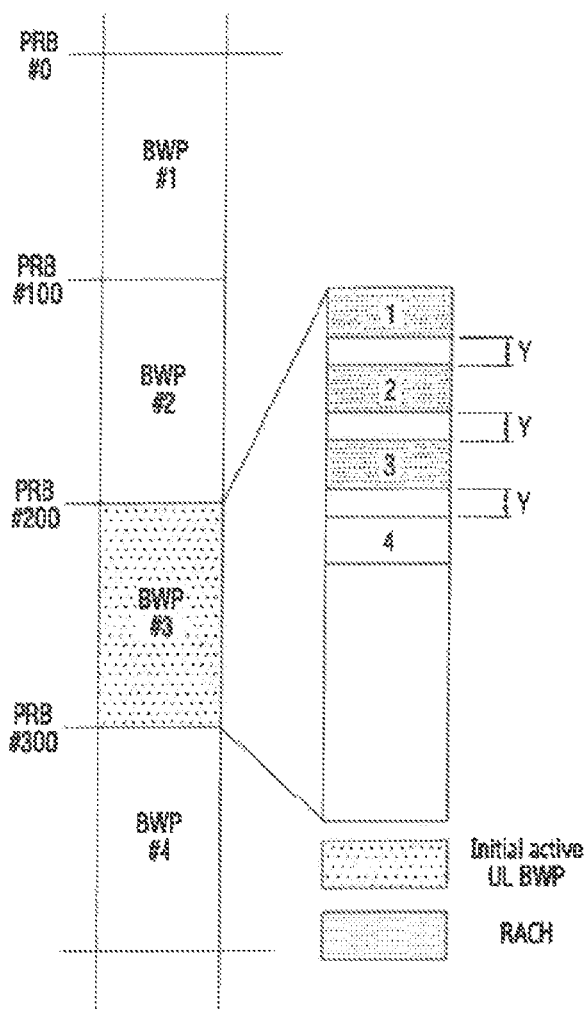
FIG. 12 illustrates a fourth exemplary diagram of confirmation of a frequency-domain position of an PRACH according to various embodiments of the present disclosure.

Particularly, X=0. That is, the network equipment pre-configures that the first PRACH starts from the lowest numbered resource block of the initial active UL BWP, and the remaining PRACHs are determined according to the offset of Y PRBs between adjacent PRACHs, as shown in FIG. 12. Particularly, it is also possible to determine other PRACHs except for the first PRACH by the frequency-hopping rule. That is, after the UE determines the first PRACH, by using the central position of the initial active UL BWP as axis, the UE symmetrically finds a second PRACH, and the frequency-domain ending position of this PRACH also has X PRBs away from the ending position of the initial active UL BWP. A starting position of a third PRACH has Y PRBs away from the ending position of the first PRACH. Similarly, a starting position of a fourth PRACH is also determined according to the frequency-hopping rule.

Embodiment 2

In Embodiment 2 of the present disclosure, determining, by a UE, possible beam failure recovery request resources according to the determined PRACH occasions and the beam failure recovery request resource information pre-configured or configured by a network equipment will be described.

Preferably, it is possible to acquire, by configuration information of the network equipment, an initial active UL BWP and a frequency-domain position of a corresponding available beam failure recovery request resource by a method similar to that in Embodiment 1, wherein a method for configuring the frequency-domain position of the beam failure recovery request resource is the same as the method for configuring the frequency-domain position of the above random access resource and will not be repeated here, and the time-domain position of the available beam failure recovery request resource is the same as the time-domain position of the available random access resource.

Preferably, it is also possible to determine a frequency-domain position of an available beam failure recovery request resource by the determined initial active UL BWP and the frequency position of the corresponding available PRACH as well as the configured beam failure recovery request resource configuration information.

Figure 13:
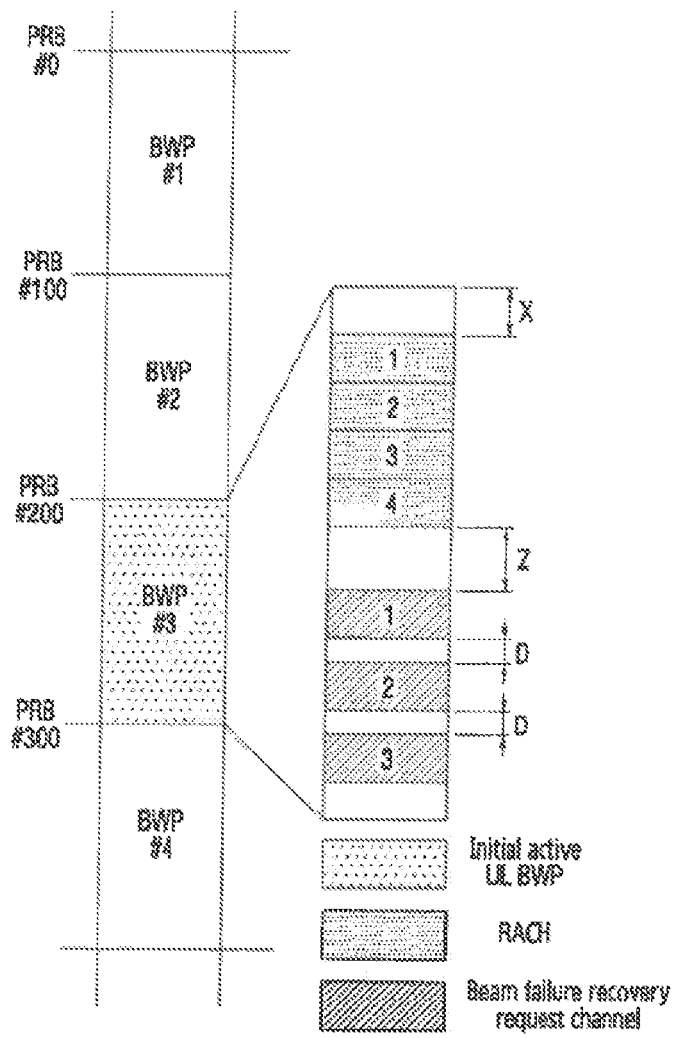
FIG. 13 illustrates a first exemplary diagram of confirmation of a frequency-domain position of a beam failure recovery request resource according to various embodiments of the present disclosure.

When the determined M available PRACHs are continuous,

A UE finds a first available beam failure recovery request resource by the offset of Z PRBs between the frequency-domain ending position of the first beam failure recovery request resource and the frequency-domain ending position of the last PRACH pre-configured or informed by the configuration of the network equipment, as shown in FIG. 13. For example, if the X pre-configured or configured by the network equipment is 3 PRBs and each PRACH occupies 6 PRBs, in this case, the network equipment configures four continuous available PRACH occasions, and the configured Z is 3 PRBs, so that it is indicated the frequency-domain position of the first available beam failure recovery request resource starts from the 30th PRB away from the lowest numbered resource block of the initial active UL BWP. The specific value of Z may be informed by N bits, or the configured value of Z may be obtained by N bits through a look-up table. The look-up table is similar to that in the foregoing embodiment and will not be repeated here.

Particularly, Z may be pre-configured or configured as 0, so that it is indicated that the PRACHs and the beam failure recovery request resources are continuous in the frequency domain.

In addition, the UE may also determine, by the offset of D PRBs between two adjacent beam failure recovery request channels pre-configured or informed by the configuration of the network equipment, subsequent available beam failure recovery request channels, as shown in FIG. 13. For example, if the D pre-configured or configured by the network equipment is 1 PRB, a frequency-domain starting position of a next beam failure recovery request channel is obtained after adding D=1 PRB to a frequency-domain ending position of a previous beam failure recovery request channel. The specific value of D may be informed by N bits, or the configured value of D may be obtained by N bits through a look-up table. The look-up table is similar to that in the foregoing embodiment and will not be repeated here.

Particularly, D may be pre-configured or configured as 0, so that it is indicated that the available beam failure recovery request resources are continuous in the frequency domain.

Figure 14:
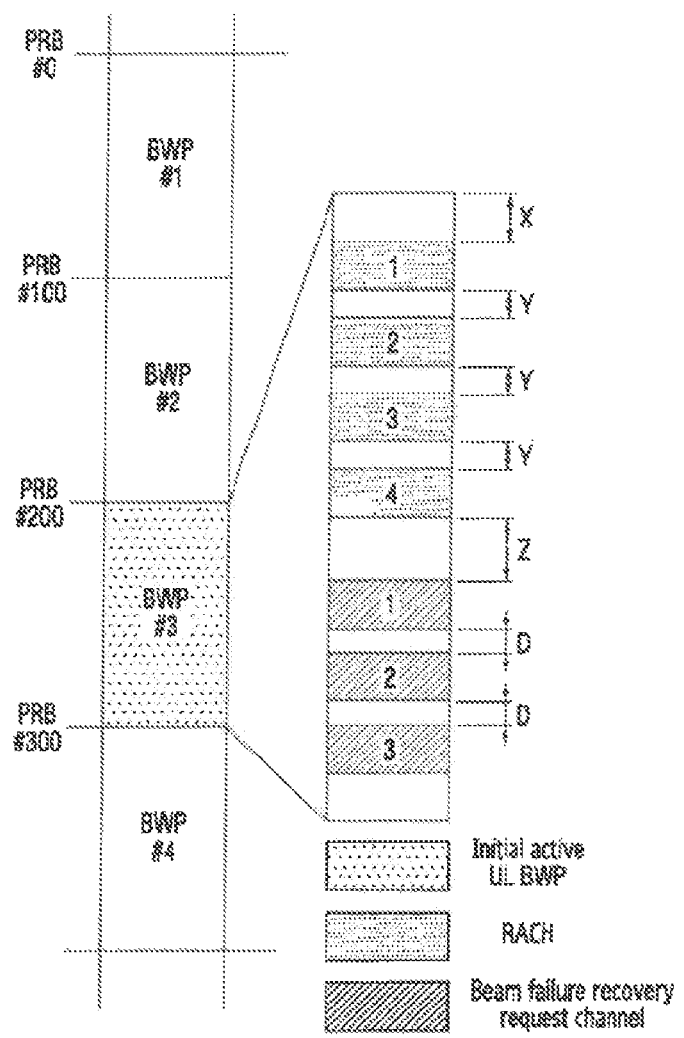
FIG. 14 illustrates a second exemplary diagram of confirmation of a frequency-domain position of a beam failure recovery request resource according to various embodiments of the present disclosure.

When the determined M available PRACHs are discontinuous,

A UE finds a first available beam failure recovery request resource according to the offset of Z PRBs between the frequency-domain ending position of the first beam failure recovery request resource and the frequency-domain ending position of the last PRACH pre-configured or informed by the configuration of the network equipment, as shown in FIG. 14. For example, if the X pre-configured or configured by the network equipment is 3 PRBs, the offset Y between every two adjacent PRACHs is 1 PRB and each PRACH occupies 6 PRBs, in this case, the network equipment configures four continuous available PRACH occasions, and the configured Z is 3 PRBs, so that it is indicated the frequency-domain position of the first available beam failure recovery request resource starts from the 33th PRB away from the lowest numbered resource block of the initial active UL BWP. The specific value of Z may be informed by N bits, or the configured value of Z may be obtained by N bits through a look-up table. The look-up table is similar to that in the foregoing embodiment and will not be repeated here.

Particularly, Z may be pre-configured or configured as 0, so that it is indicated that the PRACHs are immediately followed by the beam failure recovery request resources in the frequency domain.

In addition, the UE may also determine, according to the offset of D PRBs between two adjacent beam failure recovery request channels pre-configured or informed by the configuration of the network equipment, subsequent available beam failure recovery request channels, as shown in FIG. 14. For example, if the D pre-configured or configured by the network equipment is 1 PRB, a frequency-domain starting position of a next beam failure recovery request channel is obtained after adding D=1 PRB to a frequency-domain ending position of a previous beam failure recovery request channel. The specific value of D may be informed by N bits, or the configured value of D may be obtained by N bits through a look-up table. The look-up table is similar to that in the foregoing embodiment and will not be repeated here.

Particularly, D may be pre-configured or configured as 0, so that it is indicated that the available beam failure recovery request resources are continuous in the frequency domain.

Figure 15:
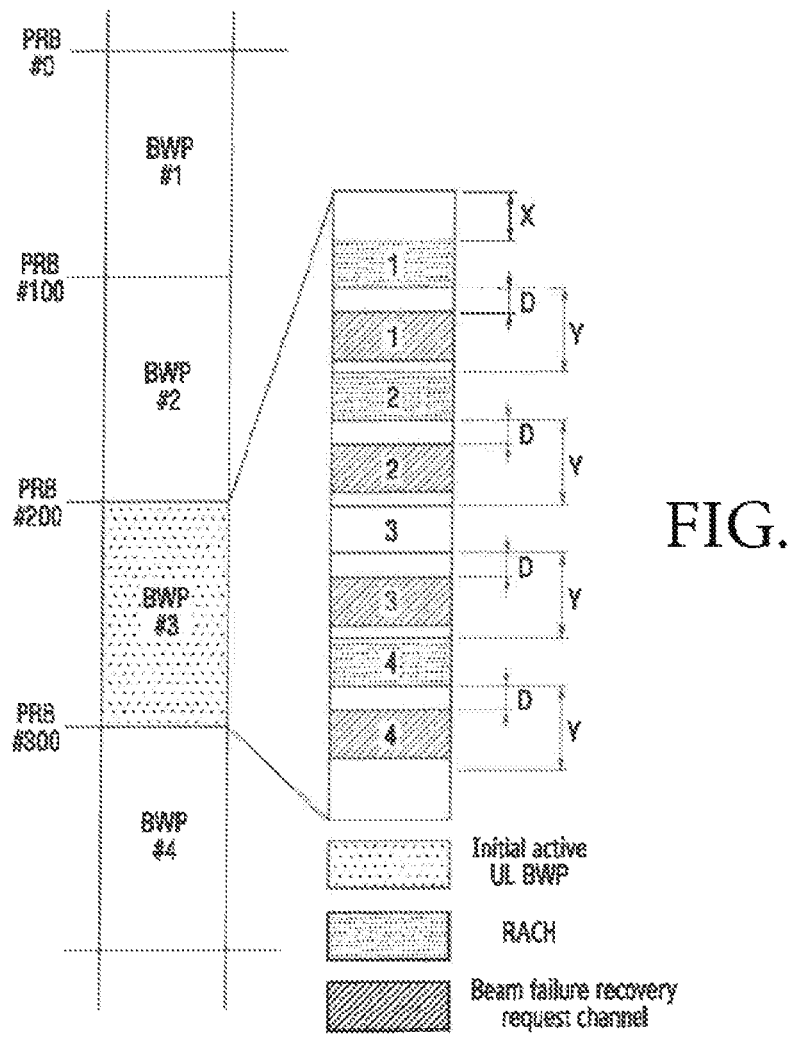
FIG. 15 illustrates a third exemplary diagram of confirmation of a frequency-domain position of a beam failure recovery request resource according to various embodiments of the present disclosure.

Particularly, in the two ways, the frequency-domain position of the beam failure recovery request resource is determined relative to the corresponding position of the last PRACH. However, in the following way, the present disclosure proposes that the frequency-domain position of a corresponding beam failure recovery request resource is determined according to each PRACH separately. That is, a frequency offset of Y PRBs between a next neighboring PRACH and this PRACH and a frequency offset of D PRBs between a next neighboring beam failure recovery request resource and this PRACH will be pre-configured or informed by the configuration of the network equipment. As shown in FIG. 15, when the UE has determined the position of the first PRACH (PRACH #1), it is known according to Y=5 PRBs and D=1 PRB pre-configured or informed by the configuration of the network equipment that a position after 1 PRB from the ending position of this PRACH corresponds to a frequency-domain starting position of a beam failure recovery request resource (BFRQ #1), and a position after 5 PRBs from the ending position of this PRACH corresponds to a frequency-domain starting position of a next PRACH (PRACH #2).

It is to be noted that, the forgoing description merely shows preferred embodiments of the present application and is not intended to limit the present application. Any modification, equivalent replacement or improvement made within the spirit and principle of the present application shall fall into the protection scope of the present application.

Figure 16:
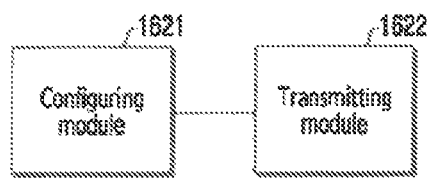
FIG. 16 illustrates a schematic diagram of a basic structure of a terminal equipment according to various embodiments of the present disclosure.

Another embodiment of the present disclosure provides a network equipment, as shown in FIG. 16, including a configuring module 1621 and a transmitting module 1622.

Wherein, the configuring module 1621 is configured to configure an initial active UL BWP and a corresponding random access resource. The transmitting module 1622 is configured to transmit, to a UE, configuration information of the initial active UL BWP and the corresponding random access resource configuration information for the UE to perform random access procedure.

Figure 17:
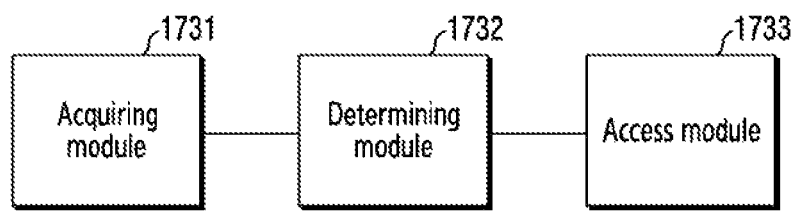
FIG. 17 illustrates a schematic diagram of a basic structure of a network equipment according to various embodiments of the present disclosure.

Another embodiment of the present disclosure provides a user equipment, as shown in FIG. 17, including an acquiring module 1731, a determining module 1732 and an access module 1733.

The acquiring module 1731 is configured to acquire configuration information of an initial active UL BWP and corresponding random access resource configuration information.

The determining module 1732 is configured to determine, based on the configuration information of the initial active UL BWP and the configuration information of the random access resource, the corresponding PRACH occasions.

The access module 1733 is configured to perform random access procedure based on the determined PRACH occasions.

Another embodiment of the present disclosure provides a network equipment, including: a processor; and a memory configured to store machine-readable instructions which, when executed by the processor, enable the processor to execute the resource configuration method described above. The network equipment may be specifically a base station equipment, a network access point equipment, a network repeater or more.

Another embodiment of the present disclosure provides a user equipment, including: a processor; and a memory configured to store machine-readable instructions which, when executed by the processor, enable the processor to execute the resource determination method described above.

Figure 18:
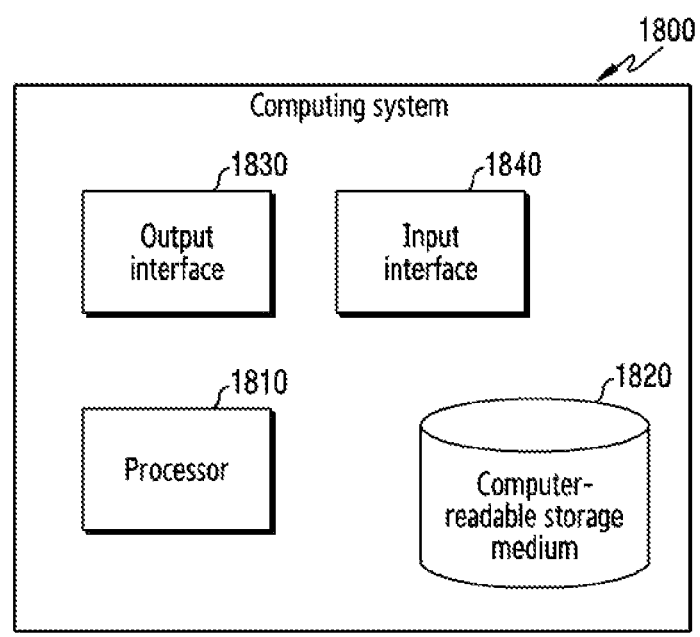
FIG. 18 illustrates a block diagram of a computing system for implementing the network equipment or user equipment according to various embodiments of the present disclosure.

FIG. 18 schematically shows a block diagram of a computing system for implementing the network equipment or user equipment according to an embodiment of the present disclosure.

Figure 5:
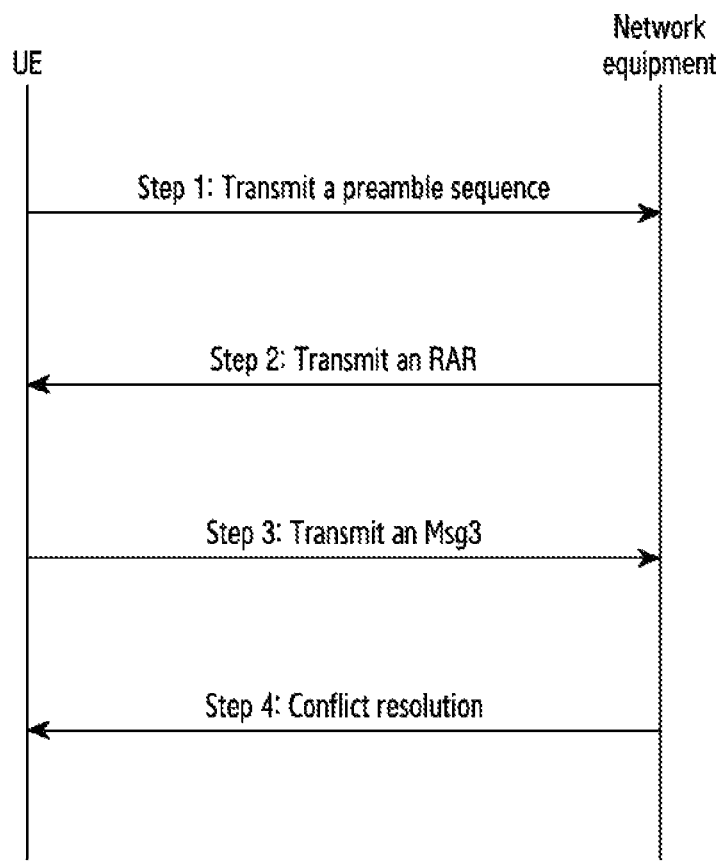
FIG. 5 illustrates a schematic flowchart of the conventional contention-based random access according to various embodiments of the present disclosure.

As shown in FIG. 18, the computing system 1800 includes a processor 1810, a computer-readable storage medium 1820, an output interface 1830 and an input interface 1840. The computing system 1800 may execute the method described above with reference to FIG. 5 or FIG. 8, to configure a reference signal and then perform data transmission based on this reference signal.

Specifically, for example, the processor 1810 may include a general-purpose microprocessor, an instruction set processor and/or a related chipset and/or a dedicated microprocessor (e.g., an Application Specific Integrated Circuit (ASIC), or more. The processor 1810 may further include an onboard memory for cache purpose. The processor 1810 may be a single processing unit or multiple processing units used for executing different actions in the method flow described with reference to FIG. 5 or FIG. 8.

For example, the computer-readable storage medium 1820 may be any medium capable of containing, storing, conveying, propagating or transmitting instructions. For example, the readable storage medium may include, but not limited to: electrical, magnetic, optical, electromagnetic, infrared or semiconductor systems, apparatuses, devices or propagation mediums. The specific examples of the readable storage medium include: a magnetic storage device, such as a magnetic tape or a Hard Disk Drive (HDD); an optical storage device, such as CD-ROM; a memory, such as a Random Access Memory (RAM) or a flash memory; and/or, a wired/wireless communication link.

The computer-readable storage medium 1820 may include computer programs. The computer programs may include codes/computer-executable instructions which, when executed by the processor 1810, enable the processor 1810 to execute the method flow described above with reference to FIG. 5 or FIG. 8 and any variations thereof.

The computer programs may be configured to have computer program codes, for example, including computer program modules. For example, in an exemplary embodiment, the codes in the computer programs may include one or more program modules, for example, module 1, module 2, or more. It is to be noted that, the division mode and the number of modules are not fixed, and a proper program module or a combination of program modules may be used by those skilled in the art according to the actual situation. When the combination of program modules is executed by the processor 1810, the processor 1810 may execute the method flow described above with reference to FIG. 5 or FIG. 8 and any variations thereof.

According to the embodiments of the present disclosure, the processor 1810 may use the output interface 1830 and the input interface 1840 to execute the method flow described above with reference to FIG. 5 or FIG. 8 and any variations thereof.

Figure 19:
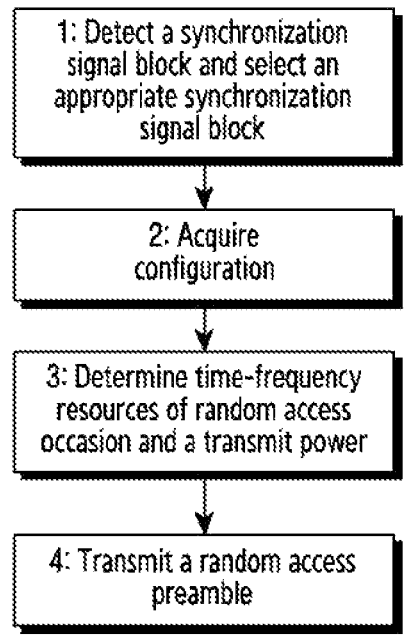
FIG. 19 illustrates a schematic flowchart of a method for configuring a transmit power of a random access preamble according to various embodiments of the present disclosure.

With respect to the transmitting problem of random access preamble under multi-beam operation in 5G, the present disclosure provides a method for configuring a transmit power of a random access preamble, as shown in FIG. 19, and the specific flow is as follows.

a terminal detects a downlink synchronization signal and selects an appropriate synchronization signal block according to a preset criteria;

the terminal reads the broadcast channel of the selected synchronization signal block, and acquires configuration information in a main information block carried by the broadcast channel and configuration information in the system information block indicated by the primary information block;

the terminal computes the path loss of the selected synchronization signal block according to the power configuration information in the configuration information of the primary information block;

the terminal obtains the location of random access occasion time-frequency resources, and determines a required random access preamble, according to the random access configuration information contained in the configuration information in the system information;

the terminal determines the transmit power for transmitting the random access preamble according to the computed path loss; and the terminal transmits the determined random access preamble, by using the computed transmit power of the random access preamble, on the determined random access occasion.

wherein the random access configuration information at least comprises random access channel configuration information, which is used for indicating time-frequency resources of the random access occasion corresponding to different synchronization signal blocks. At the same time, the random access configuration information further includes the format information of the random access preamble, which is used for indicating the structure of the random access preamble and the structure of the random access occasion. The random access configuration information further includes power configuration information in the random access process, such as a target receiving preamble power, a power ramping interval, etc.

In addition, it should be noted that in the above description, the step of acquiring configuration information (including acquiring random access configuration information and power configuration information) can be performed in parallel. The step of determining time-frequency resources, a preamble and a transmit power can also be performed in parallel.

At the same time, the method provided by the disclosure is also suitable for determining the power when a random access attempt fails and the terminal initiates a retry. Specifically, if the terminal finds that the random access attempt fails, its behavior can be summarized as follows:

the terminal determines random access occasion time-frequency resources and random access preamble resources selected in this random access attempt according to configuration information;

the terminal determines the power level of this random access attempt according to the power level of the previous random access process attempt; and the terminal adopts the determined transmit power level on the selected random access occasion to transmit the determined random access preamble.

It should be noted that when determining the random access occasion, the terminal can refer to the latest measurement result to determine an appropriate synchronization signal block. If the corresponding random access occasion has been determined, and the path loss is recomputed according to the transmit power configuration of the synchronization signal block and the measurement result of the synchronization signal block, the transmit power of the random access preamble is determined according to the transmit power configuration of the synchronization signal block. When determining the transmit power of the preamble, reference can also be made to the retransmission times counter or the power ramping counter to determine the transmit power of the random access preamble.

Figure 20:
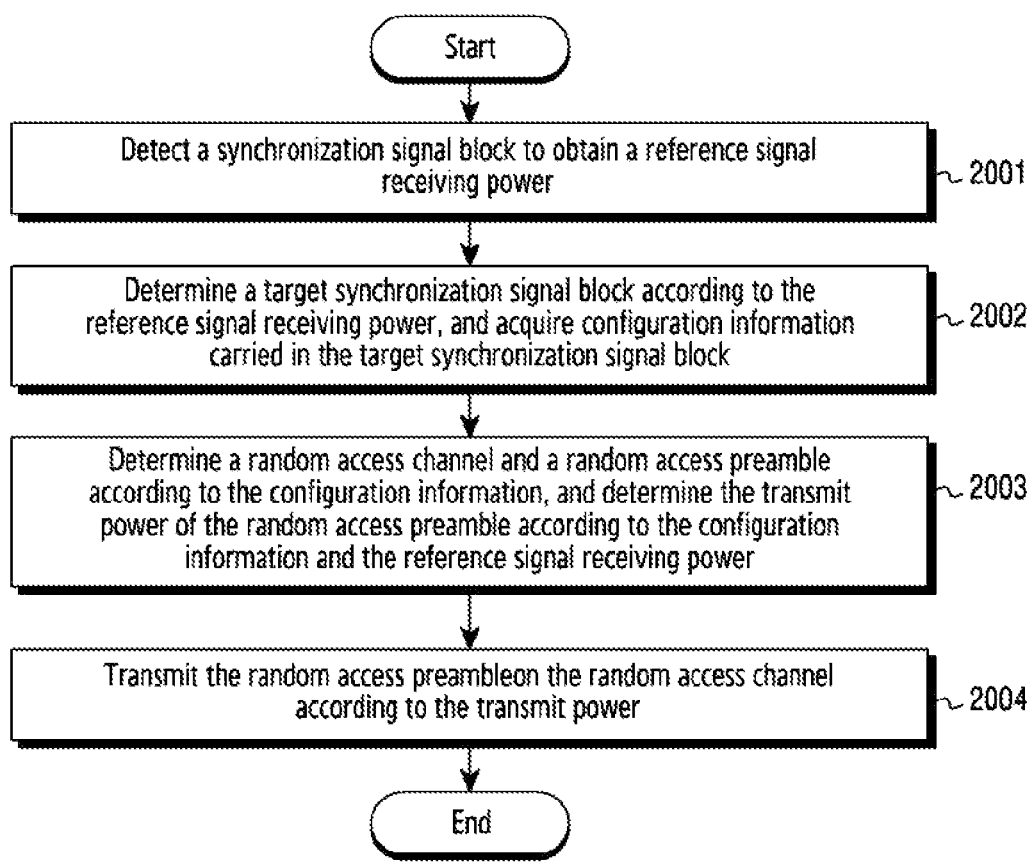
FIG. 20 illustrates a schematic flowchart of a method for transmitting a random access preamble according to various embodiments of the present disclosure.

Based on the configuration method of the transmit power of the random access preamble according to the present disclosure, the method for transmitting the random access preamble is described in detail below, as shown in FIG. 20, which includes:

Step 2001, detecting a synchronization signal block to obtain a reference signal receiving power.

Step 2002, determining a target synchronization signal block according to the reference signal receiving power, and acquiring configuration information carried in the target synchronization signal block.

Wherein the step of determining the target synchronization signal block according to the reference signal receiving power comprises any one of the following:

selecting a synchronization signal block corresponding to the reference signal receiving power with the largest value among the reference signal receiving powers as a target synchronization signal block; or, selecting synchronization signal blocks corresponding to multiple reference signal receiving powers higher than a first preset threshold among the reference signal receiving powers, and randomly selecting one synchronization signal block as a target synchronization signal block with an the equivalent probability among the selected synchronization signal blocks; selecting a synchronization signal block corresponding to the reference signal receiving power with the largest value as a target synchronization signal block, if there is no reference signal receiving power higher than the first preset threshold in the reference signal receiving powers; or, computing the path loss of each synchronization signal block according to each of the reference signal receiving powers and the transmit power indicated in the configuration information carried in the corresponding synchronization signal block, and selecting the target synchronization signal block according to the path loss.

Further, the step of selecting the target synchronization signal block according to the path loss may include the following two ways:

selecting the synchronization signal block with the smallest path loss as the target synchronization signal block; or, selecting synchronization signal blocks corresponding to multiple path losses lower than a second preset threshold among the path losses, and randomly selecting one synchronization signal block as a target synchronization signal block with the equivalent probability among the selected synchronization signal blocks; and selecting the synchronization signal block with the smallest path loss as the target synchronization signal block, if there is no path loss lower than the second preset threshold among the path losses.

Step 2003, determining a random access channel and a random access preamble according to the configuration information, and determining the transmit power of the random access preamble according to the configuration information and the reference signal receiving power.

In this step, the configuration information is power configuration information, and the step of determining the transmit power of the random access preamble according to the configuration information and the reference signal receiving power comprises:

determining the transmit power of the target synchronization signal block according to the power configuration information;

computing the path loss of the target synchronization signal block according to the transmit power of the target synchronization signal block and the reference signal receiving power; and computing to obtain the transmit power of the random access preamble according to the power configuration information and the path loss of the target synchronization signal block.

Further, the step of determining the transmit power according to the power configuration information includes any one of the following ways:

1) acquiring the transmit power of the target synchronization signal block; and 2) determining the transmit power according to the reference transmit power and the power fluctuation parameters.

The following describes the above ways respectively.

For way 1)

The step of acquiring the transmit power of the target synchronization signal block comprises:

acquiring quantized transmit powers carried in the power configuration information.

Or, acquiring first index information of the target synchronization signal block carried in the power configuration information; and checking a transmit power mapping list according to first index information, and acquiring the transmit power corresponding to the first index information.

Or, acquiring a power configuration parameter sequence contained in the configuration parameter; wherein the power configuration parameter sequence is a sequence composed of transmit power information corresponding to each synchronization signal block group in the current power group; and determining the transmit power according to the index information of the target synchronization signal block and the power configuration parameter sequence.

Or, acquiring the number of power groups contained in the power configuration information, synchronization signal block index information in each power group, a synchronization signal block index sequence and transmit power configuration information corresponding to each power group; wherein one power group consists of multiple synchronization signal blocks, and the transmit power configuration information of all synchronization signal blocks in each power group is the same as each other; the synchronization signal block index sequence is a sequence composed of index information of multiple synchronization signal blocks with the same transmit power:

selecting a power group matched with the target synchronization signal block according to the index information of the target synchronization signal block, the synchronization signal block index information in each power group and the synchronization signal block index sequence; and determining the transmit power according to the transmit power configuration information corresponding to the selected power group.

Wherein if number of synchronization signal blocks in each power group is different, the power configuration information further includes the number of synchronization signal blocks in each power group.

Or, acquiring number of power groups contained in the power configuration information, index information of synchronization signal block groups in each power group and transmit power configuration information corresponding to each synchronization signal block group in each power group; wherein one power group consists of multiple synchronization signal block groups, and the transmit power configuration information of all synchronization signal blocks in each synchronization signal block group of each power group is the same;

selecting synchronization signal block groups in the power groups matched with the target synchronization signal block according to the index information of the target synchronization signal block and the synchronization signal block group index information in each power group; and determining the transmit power according to the transmit power configuration information corresponding to the selected synchronization signal block group.

Or, acquiring transmit power configuration information corresponding to a power group contained in the power configuration information; wherein one power group consists of multiple synchronization signal block groups, and the transmit power configuration information of all synchronization signal blocks in each synchronization signal block group of each power group is the same as each other; and determining the transmit power configuration information corresponding to the power group as the transmit power of the target synchronization information block.

For way 2), it can also specifically include the following four methods:

The step of determining the transmit power according to the reference transmit power and the power fluctuation parameters comprises:

(1) acquiring a quantized reference transmit power and second index information carried in the power configuration information;

checking a power fluctuation parameter mapping list according to the second index information, and acquiring the power fluctuation parameters corresponding to the second index information; and computing and acquiring the transmit power of the target synchronization signal block according to the quantized reference transmit power and the power fluctuation parameters.

(2) acquiring the quantized reference transmit power and the quantized power fluctuation parameters carried in the power configuration information; and computing and acquiring the transmit power of the target synchronization signal block according to the quantized reference transmit power and the quantized power fluctuation parameters.

(3) acquiring second index information of the target synchronization signal block carried in the power configuration information;

checking a power fluctuation parameter mapping list according to the second index information, and acquiring the power fluctuation parameters corresponding to the second index information; and computing and acquiring the transmit power of the target synchronization signal block according to the preset reference transmit power and the power fluctuation parameters.

(4) acquiring preconfigured power fluctuation parameters and third index information carried in the power configuration information;

checking a reference transmit power mapping list according to the third index information, and acquiring the reference transmit power corresponding to the third index information; and computing and acquiring the transmit power of the target synchronization signal block according to the reference transmit power and the power fluctuation parameters.

(5) acquiring second index information and third index information carried in the power configuration information;

checking a power fluctuation parameter mapping list according to the second index information, and acquiring the power fluctuation parameters corresponding to the second index information;

checking a reference transmit power mapping list according to the third index information, and acquiring the reference transmit power corresponding to the third index information; and computing and acquiring the transmit power of the target synchronization signal block according to the reference transmit power and the power fluctuation parameters.

In this step, the process of computing the transmit power of the random access preamble according to the power configuration information and the path loss of the target synchronization signal block is further included, and the process includes:

acquiring initial target preamble receiving power information in the power configuration information;

computing a target receiving power of a preamble according to the initial target preamble receiving power information; and computing and obtaining the transmit power of the random access preamble according to the target receiving power and the path loss of the preamble.

Wherein the process further includes:

acquiring power control parameters carried in the power configuration information; and adjusting the preamble target receiving power or the transmit power of the random access preamble according to the power control parameters.

Further, the step of acquiring power control parameters carried in the power configuration information comprises:

acquiring power control parameters of the target synchronization signal block carried in the power configuration information; or, acquiring fourth index information of the target synchronization signal block carried in the power configuration information; and checking a power control parameter mapping list according to the fourth index information, and acquiring the power control parameters corresponding to the fourth index information.

Step 2004, transmitting the random access preamble on the random access channel according to the transmit power.

Based on the transmitting method of the random access preamble according to the present disclosure, the following specific embodiments are described in detail by way of example.

Embodiment 3

In this embodiment, a method for configuring a transmit power of a random access preamble will be introduced in combination with a specific system. In this embodiment, an initial access process is completed in the system by transmitting a downlink synchronization signal block. Specifically, one or more downlink synchronization signal blocks are configured in the system, and each downlink synchronization signal block consists of a primary synchronization signal, a secondary synchronization signal and a broadcast channel. For a system operated in multi-beam operation, the base station configures multiple synchronization signal blocks. Different synchronization signal blocks are transmitted by using the same or different downlink transmit beams. Synchronization signal blocks which are temporally adjacent or close to each other constitute a synchronization signal block group. A plurality of synchronization signal block groups capable of covering all possible downlink transmit beam directions constitute a synchronization signal block set, as shown in FIG. 21.

Figure 21:
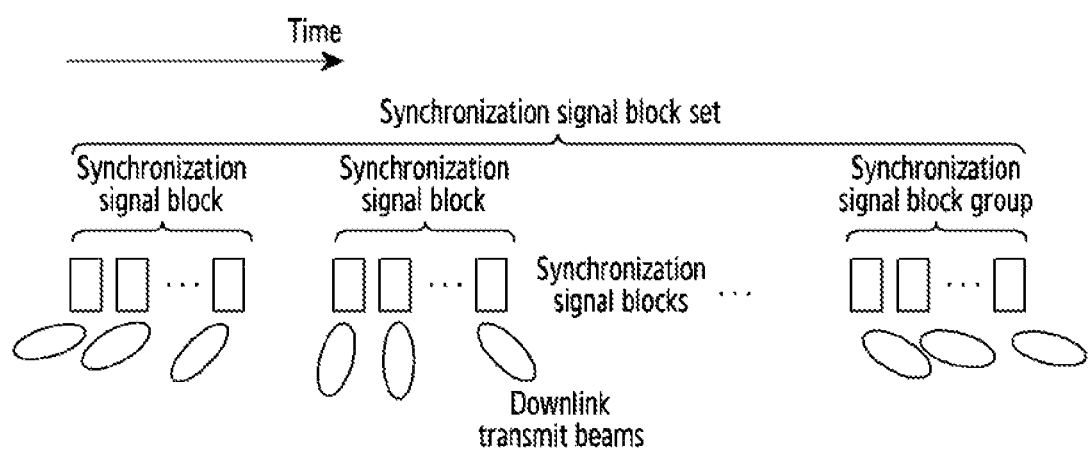
FIG. 21 illustrates a schematic diagram of transmitting a synchronization signal block according to various embodiments of the present disclosure.

It should be noted that in the example shown in FIG. 21, adjacent synchronization signal blocks use downlink transmit beams with adjacent directions. In an actual system, downlink transmit beams with non-adjacent directions can be used for temporally adjacent synchronization signal blocks according to the network deployment situation.

A broadcast channel in a synchronization signal block transmits a primary information block carrying necessary information for a terminal to access a network, and the primary information block carries a system information block including Remaining Minimum System Information (RMSI). Configuration information of the terminal for random access carried in the RMSI or Other System Information (OSI), includes random access channel configuration information, random access preamble pool configuration information, and other necessary configuration information.

The random access channel consists of multiple random access occasions, one of them is used for transmitting a random access preamble, and different random access occasions correspond to different synchronization signal blocks, which are used to indicate the downlink transmit beam required by the base station. Different synchronization signal blocks may correspond to the same or different random access occasions. If multiple synchronization signal blocks correspond to the same random access occasion, it is necessary to adopt a grouping of random access preamble to distinguish different synchronization signal blocks.

Information carried in the RMSI or OSI to which different synchronization signal blocks are directed is the same as each other, that is, configuration information of all random access occasion needs to be carried in the RMSI or OSI.

Different synchronization signal blocks can adopt different transmit powers to be suitable for the coverage requirements in different directions. When the terminal transmits the random access preamble, the terminal computes the path loss in the coverage area of the downlink beam based on the difference between the received reference signal receiving power of the synchronization signal block (such as the reference signal receiving power of the primary synchronization signal or the secondary synchronization signal) and the transmit power of the base station synchronization signal block, and then computes the transmit power of the random access preamble. Therefore, when different synchronization signal blocks adopt different transmit powers, the base station needs to configure and inform the transmit powers, thus the terminal is able to compute the path loss. Possible transmit power notification ways are as follows:

1. directly configuring and informing transmit power levels used by different synchronization signal blocks in the RMSI or OSI. Specifically, the quantized transmit power is used to configure and inform the transmit power of the synchronization signal block. As a specific example, a bit number k for quantizing the transmit power is preset, that is, the transmit power of each synchronization signal block is represented by k bits. Assuming that M synchronization signal blocks are configured in the system, the transmit powers of these M synchronization signal blocks are notified in the RMSI or OSI, and MK bits are used for configuring and informing. That is, power configuration parameters are defined as follows:

power configuration parameters: [power 0, power 1, . . . , power M−1]

wherein the power i (0≤i≤m−1) is the transmit power of the ith synchronization signal block, represented by k bits.

The notification accuracy in this way is related to the quantization bit number K. The larger k is, the greater the overhead is required to inform the transmit power of each synchronization signal block, but the higher the transmit power accuracy is.

In addition to directly configuring and informing the quantized transmit power level, another configuring and informing way is to configure and inform the transmit power level by using an index table. A possible look-up table is shown in Table 5.

TABLE 5 transmit power configuration

| Index | Power configuration (dBm) |
|---|---|
| 0 | 48 |
| 1 | 47 |

TABLE 5-continued transmit power configuration

| Index | Power configuration (dBm) |
|---|---|
| 2 | 46 |
| 3 | 45 |
| ... | ... |

In the example shown in Table 5, the terminal determines the transmit power of the synchronization signal block through the relationship between the index and the power configuration, and computes the path loss corresponding to the synchronization signal block accordingly.

2. if the difference between transmit powers of different synchronization signal blocks is small, the transmit powers of the different synchronization signal blocks can be notified and configured by means of power transmitting reference+power fluctuation. Specifically, the reference transmit power is configured in the RMSI or OSI, and m-bit configuration is adopted. In addition, power fluctuation configuration information is configured in the RMSI or OSI to inform the power fluctuation parameters of the transmit power of each synchronization signal block with respect to the reference transmit power. Considering that the fluctuation of the transmit power of different synchronization signal blocks will not be too large in general, this portion is used to inform that the power fluctuation parameters with respect to the reference transmit power will not be too large. For example, 2 to 3 bits are used to inform the power fluctuation with respect to the reference transmit power, as shown in the following table:

TABLE 6

Configuration of power fluctuation parameters

| Index | Power fluctuation parameter (dB) |
|---|---|
| 0 | −3 |
| 1 | −1 |
| 2 | 1 |
| 3 | 3 |

The example shown in Table 6 is a notification for power fluctuation with 2 bits. It should be noted that each synchronization signal block needs to adopt these 2-3 bits to configure the power fluctuation parameters of the synchronization signal block. Therefore, the total overhead for informing the power fluctuation parameter configuration is 2-3 bits multiplied by the number of synchronization signal blocks. The overhead for informing the synchronization signal block of the transmit power is the sum of the overhead of the above power fluctuation parameter configuration and the configuration bits of the reference transmit power.

For the reference transmit power, it will be more simple and convenient to be notified by defining several preset transmit powers and configuring and informing them by index. An index representation is shown in Table 7.

TABLE 7

Reference transmit power configuration

| Index | Reference transmit power (dBm) |
|---|---|
| 0 | 46 |
| 1 | 40 |
| 2 | 23 |
| ... | ... |

The terminal computes the downlink transmit power of the corresponding synchronization signal block according to the received reference transmit power and the power fluctuation parameters of the corresponding synchronization signal block. For example, if the reference transmit power received by the terminal is 46 dBm and the corresponding power fluctuation parameters of the synchronization signal block selected by the terminal is 1 dB, the transmit power of the synchronization signal block is 46 dBm+1 dB=47 dBm. The terminal will compute the path loss according to the transmit power, and then compute the transmit power for the random access preamble.

In addition, it should be noted that as specific example of the present method, the fixed reference transmit power is known by both the base station and the terminal, thus notification and configuration is not required. It is only necessary to configure the power fluctuation parameters. The configuration of the power fluctuation parameters can refer to the above Table 6, and the index table is adopted to inform the index of the power fluctuation parameters, etc.

3. the base station groups synchronization signal blocks with the same or similar downlink transmit power, and transmits them on adjacent time-frequency resource blocks. Synchronization signal blocks on adjacent time-frequency resource blocks adopt approximately the same transmit power, that is, synchronization signal blocks are grouped, different synchronization signal blocks in a group adopt approximately the same transmit power, and synchronization signal blocks among groups can adopt different or approximately different transmit powers. It should be noted that since there is a configuration way of synchronization signal block groups in the configuration of synchronization signal blocks, a group of synchronization signal blocks with approximately the same transmit power can be configured in one synchronization signal block group, or several groups of synchronization signal blocks can be configured in the same synchronization signal block group, so as to facilitate configuration. The above two examples are shown in FIG. 22.

Figure 22:
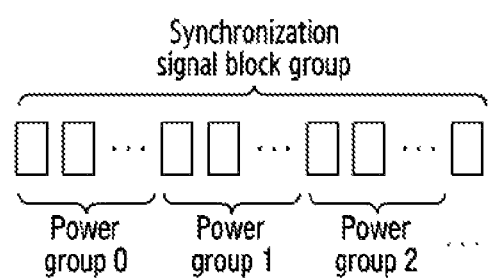
FIG. 22 illustrates a schematic diagram of power configuration in a synchronization signal block group according to various embodiments of the present disclosure.

In this FIG. 22, synchronization signal blocks with approximately the same transmit powers are configured to be transmitted on adjacent time-frequency resources to constitute a power group. Another possibility is that there are more synchronization signal blocks with approximately the same transmit power in a power group, at this time, synchronization signal blocks in multiple synchronization signal block groups can be set as one power group.

In RMSI or OSI, the synchronization signal blocks in the power group and the transmit power of the corresponding power group are uniformly configured. In the configuration notification, the configuration method of this power group is included. One possible configuration and notification way is to configure and inform the number of power groups, the synchronization signal block index contained in each power group, and the configuration of downlink transmit power in each power group.

The configuration parameters in each power group are: {synchronization signal block index sequence, transmit power configuration information}, wherein the synchronization signal block index sequence is a sequence consists of indexes corresponding to synchronization signal blocks using the same transmit power in the power group. wherein the index of the synchronization signal block is a logical index of the synchronization signal block or a synchronization signal block index characterized by a time index, such as a subframe index, a slot index or a mini slot index. The configuration of transmit power can adopt two configurations described above, namely, the transmit power of each power group can be directly quantized and notified. Alternatively, configuring and informing the reference transmit power and the power fluctuation parameters of each power group may be with respect to the reference transmit power.

If the number of synchronization signal blocks contained in different power groups is different, it is necessary to increase the number information of synchronization signal blocks contained in the power groups in the configuration parameters of the power groups. At this time, the configuration parameters of each power group are: (number of synchronization signal blocks, synchronization signal block index sequence, transmit power configuration information).

If the definition of the power group matches the definition of the synchronization signal block group, that is, the synchronization signal block group contains a complete power group, the transmit power can be configured for the synchronization signal block group. The configuration and notification of the transmit power can adopt the above two ways.

If one power group includes multiple synchronization signal block groups, the synchronization signal block index in the configuration parameters of the power group can be modified to the synchronization signal block group index, and the transmit power levels of the multiple synchronization signal block groups can be configured at the same time.

Another power group notification and configuration way is to configure and inform only the transmit power configuration information of each synchronization signal block group in the power group, that is, to inform the power configuration parameter sequence, and the terminal determines the selected transmit power configuration way according to a certain criteria. One possible way is that the terminal determines the corresponding configuration parameters in the power configuration parameter sequence according to a preset criteria and the number of synchronization signal block groups or the number of synchronization signal blocks. Specifically, the sequence of power configuration parameters in the RMSI or OSI is {P0, . . . , PN−1}, there are N elements in this sequence, and each element represents a power configuration parameter. For the synchronization signal block with the synchronization signal block index ISS, the index of its corresponding power configuration parameter in the notification power configuration parameter sequence is n=mod(Iss, N).

That is, the power configuration parameters selected by the terminal is Pn.

Another way to choose power configuration parameters is that for synchronization signal blocks with synchronization signal block index ISS, the index of corresponding power configuration parameters in the notification power configuration parameter sequence is n=[$I_{ss}$/N].

In this embodiment, the terminal side behavior can be briefly described as follows:

The terminal performs an initial access process, detects a synchronization signal block, and reads the content of the main information block carried by the broadcast channel. According to the received power of the detected reference signal, a suitable synchronization signal block is determined based on a preset criteria.

Reading RMSI or OSI indicated by the main information block, acquiring random access channel configuration information therein, and determining time-frequency resources of a random access occasion and a random access preamble according to the random access channel configuration information.

According to the synchronization signal block power configuration information in the RMSI or OSI, the transmit power of the selected synchronization signal block is acquired, and the path loss is computed according to the measured reference signal receiving power of the synchronization signal block. The path loss is computed as follows: Path loss (dB)=transmit power (dBm)-reference signal receive power (dBm).

The terminal determines the transmit power of the random access preamble according to the path loss, and transmits the determined random access preamble in the random access channel determined in the foregoing step.

Figure 23:
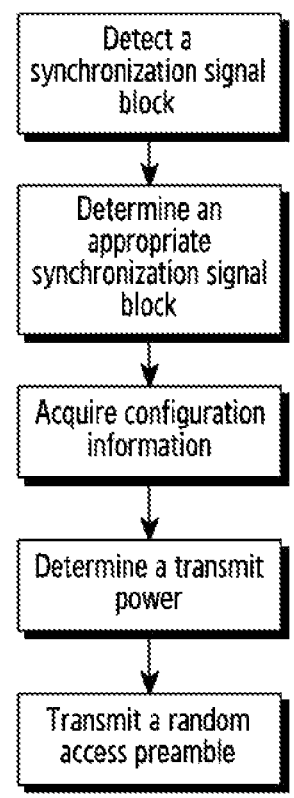
FIG. 23 illustrates a schematic flowchart of a method for transmitting a random access preamble according to various embodiments of the present disclosure.

The above process can be described with reference to FIG. 23. Wherein the predetermined criteria for determining a suitable synchronization signal block may include: 1. selecting a synchronization signal block according to the reference signal receiving power of the synchronization signal block. For example, selecting a synchronization signal block with the largest reference signal receiving power, or randomly selecting a synchronization signal block with the equivalent probability among the synchronization signal blocks with the reference signal receiving power higher than the threshold according to a predetermined threshold or a threshold configured by base station, and if there is no synchronization signal block, the reference signal receiving power of which is higher than the threshold, selecting the synchronization signal block with the largest reference signal receiving power. 2. computing the path loss of the synchronization signal block according to the reference signal receiving power of the synchronization signal block and the main information block in the broadcast channel, or the transmit power information of the synchronization signal block carried in the RMSI or OSI, and selecting the synchronization signal block according to the path loss. For example, selecting the synchronization signal block with the smallest path loss, or selecting the synchronization signal block with the path loss lower than the threshold according to a predetermined threshold, from which one synchronization signal block is selected with the equivalent probability. If there is no synchronization signal block with the path loss lower than the threshold, selecting the synchronization signal block with the smallest path loss.

It should be noted that in this embodiment, the transmit power information of the synchronization signal block can also be transmitted in OSI.

Embodiment 4

In this embodiment, a method for configuring a transmit power of a random access preamble will be introduced in combination with a specific system. In this implementation, the purpose of informing different synchronization signal blocks of different transmit powers is achieved by configuring the reference transmit power of the preamble, so that the terminal can select the appropriate transmit power of the random access preamble when selecting a specific synchronization signal block.

Specifically, the transmit power configuration of synchronization signal blocks is transmitted in the RMSI or OSI. The transmit power configuration may be a rough configuration. At the same time, in the random access configuration information, the target receiving power configuration for the random access occasion is carried. By adjusting the transmit power of synchronization signal blocks and the target receive power of the random access occasion, the base station can configure different synchronization signal blocks to adopt different transmit powers, and at the same time, it is ensured that the terminal can correctly estimate the path loss of different synchronization signal blocks.

Specifically, configuration information of transmit power of synchronization signal blocks is transmitted in the RMSI or OSI. Possible ways are:

1. configuring and informing the transmit power of each synchronization signal block by quantization or an index. The transmit power of each synchronization signal block can be notified directly, or the reference transmit power can be notified by preset or notified in the RMSI or OSI, and the power fluctuation parameters of each synchronization signal block can be notified. Wherein the reference transmit power can be determined in a preset way, and may also be configured in the RMSI or OSI.
2. dividing synchronization signal blocks with similar transmit powers into one group, and uniformly configuring and informing the transmit powers of synchronization signal blocks in the group by grouping. The synchronization signal blocks in the group are configured in a unified way, and the configuration way may adopt direct notification of the transmit power configuration, may adopt the index table to inform the transmit power configuration in the group, or may adopt the configuration way of reference transmit power+power fluctuation parameters to configure the transmit power, wherein the reference transmit power can be determined in a preset way, or can be configured in the RMSI or OSI.

In way 2, the configuration way of grouping can adopt the way adopted in Embodiment 3. It is simpler to group synchronization signal blocks according to the configuration of the synchronization signal block group, that is, the synchronization signal blocks which can be configured with the same transmit power are placed in adjacent locations to constitute the synchronization signal block group. In this way, each synchronization signal block configuration is suitable for the transmit power of each synchronization signal block in the synchronization signal block group.

Configuring different initial target preamble receiving powers in random access configuration information for different random access occasions corresponding to different synchronization signal blocks, computing the preamble receiving target powers according to the initial target preamble receiving powers, and computing the transmit powers of the random access preambles in conjunction with path loss. Specifically, combining the actual transmit power with the transmit power configured in the RMSI or OSI, the initial target preamble receiving power is configured. A simple example is that the expected receiving power of the preamble of the base station is −110 dBm, and the transmit power of the synchronization signal block configured in the RMSI or OSI is 45 dBm. However, as the configuration of the transmit power is relatively rough, the transmit power of the synchronization signal block selected by the terminal is different from that configured in the RMSI or OSI, which is higher than the configured transmit power by 1 dB. Therefore, when configuring the receiving power of the initial target preamble, the configuration is −111 dBm, that is, the configured receiving power of the initial target preamble is 1 dB lower than that of the expected preamble.

It should be noted that different random access occasions corresponding to different synchronization signal blocks may configure different initial target preamble receiving powers. Specifically, one possible configuration way is to configure the initial target preamble receiving power sequence according to the index order of the synchronization signal blocks, and each element in the sequence indicates the configuration value of the initial target preamble receiving power of the random access occasion corresponding to the corresponding indexed synchronization signal block. For example, for a system with eight synchronization signal blocks, when configuring the initial target preamble receiving power sequence of random access occasion corresponding to these eight synchronization signal blocks, the sequence containing eight elements should be configured, for example: The receiving power of the initial target preamble is: {a0,a1,a2,a3,a4,a5,a6,a7}. wherein the unit of ai is dBm, which indicates the initial target preamble receiving power configured by the random access occasion corresponding to the ith synchronization signal block, $0 \leq i \leq 7$.

For the case that multiple synchronization signal blocks correspond to the same random access occasion, the configuration of the initial target preamble receiving power can still be carried out according to the above way. Another configuration way is to configure the initial target preamble receiving power for the random access occasion. Specifically, when configuring time-frequency resources of the random access occasion, the initial target preamble receiving power of each random access occasion is configured at the same time. Alternatively, numbering index of random access occasions is performed according to a preset criteria, and the target preamble receiving power sequence is configured according to the number of random access occasions, and the elements in the sequence are the configuration of the target preamble receiving power of the corresponding random access occasion. A simple example is that the base station configures eight random access occasions, the configured target preamble receiving power sequence length is 8, and the sequence is {b0,b1,b2,b3,b4,b5,b6,b7}, wherein the unit of bi is dBm, which indicates the initial target preamble receiving power configured by the ith random access occasion, $0 \leq i \leq 7$.

Similar to the way in which the transmit power is configured by grouping synchronization signal blocks in Embodiment 3, the transmit power can also be configured by grouping synchronization signal blocks or random access occasions. Specifically, synchronization signal blocks configured with approximately the same transmit power or approximately the same initial target preamble receiving power are arranged in adjacent locations, and the grouping method and the initial target preamble receiving power of each group are configured in the RMSI or OSI. One possible way is to configure synchronization signal block grouping by way of an index sequence. One possible way is to transmit grouping information or information of index sequences in each group in the RMSI or OSI A simple example is that the information required for grouping information includes:

number of groups
group 1: {intra-group synchronization signal block index};
group 2: {intra-group synchronization signal block index};

group n: {intra-group synchronization signal block index}.

Another way of grouping is to inform only the transmit power configuration of each group, that is, to inform the power configuration parameter sequence, and the terminal determines the way of selected transmit power configuration according to a certain criteria. One possible way is that the terminal determines the corresponding configuration parameters in the power configuration parameter sequence according to a preset criteria and the number of groups or the number of synchronization signal blocks. Specifically, the sequence of power configuration parameters in the RMSI or OSI is {P0, . . . , PN−1}, there are N elements of the power sequence, and each element represents one power configuration parameter. For the synchronization signal block with the synchronization signal block index ISS, the index, of the corresponding power configuration parameters, in the power configuration parameter sequence is n=mod(Iss, N).

That is, the power configuration parameter selected by the terminal is Pn.

Another way to choose power configuration parameters is, for the synchronization signal block with the synchronization signal block index ISS, the index, of the corresponding power configuration parameters, in the power configuration parameter sequence is n=[$I_{ss}$/N].

The grouping method and the notification and configuration way of power can be used in combination. A simple example is to configure the transmit power of the synchronization signal block group with the synchronization signal block group, that is, each synchronization signal block in the same synchronization signal block group adopts the same transmit power configuration. At the same time, informing or configuring further grouping, or configuring the initial target preamble receiving power of the synchronization signal block, inside the synchronization signal block group.

When adopting the method provided in the above embodiment, the behavior of the terminal side can be briefly described as follows:

The terminal performs the initial access process, detects the synchronization signal block, and reads the content of the main information block carried by the broadcast channel. Determining a suitable synchronization signal block according to the received power of the detected reference signal and the predetermined criteria.

Reading the RMSI or OSI indicated by the main information block, acquiring random access channel configuration information therein, and determining time-frequency resources of the random access occasion and the random access preamble according to the random access channel configuration information.

Acquiring the transmit power of the selected synchronization signal block according to the synchronization signal block power configuration information in the RMSI or OSI, and computing the path loss according to the measured reference signal receiving power of the synchronization signal block. The path loss is computed as: path loss (dB)=transmit power (dBm)-reference signal receive power (dBm).

The terminal computes the preamble target receiving power according to the configuration information of the initial target preamble receiving power in the random access configuration information and the information such as a random access power ramping counter. In combination with the computed path loss, the transmit power of the preamble can be acquired. Using this transmit power, the determined random access preamble is transmitted in the random access channel determined in the previous step.

Wherein the predetermined criteria for determining suitable synchronization signal blocks may include: 1. selecting a synchronization signal block according to the reference signal receiving power of the synchronization signal block. For example, selecting a synchronization signal block with the largest reference signal receiving power, or randomly selecting a synchronization signal block with the equivalent probability among the synchronization signal blocks with the reference signal receiving power higher than the threshold, according to a predetermined or a threshold configured by base station, and if there is no synchronization signal block, the reference signal receiving power of which is higher than the threshold, selecting the synchronization signal block with the largest reference signal receiving power. 2. computing the path loss of the synchronization signal block according to the reference signal receiving power of the synchronization signal block and the primary information block in the broadcast channel, or the transmit power information of the synchronization signal block carried in the RMSI or OSI, and selecting the synchronization signal block according to the path loss. For example, selecting the synchronization signal block with the smallest path loss, or selecting the synchronization signal block with the path loss lower than the threshold according to a predetermined threshold, from which one synchronization signal block is selected with the equivalent probability. If there is no synchronization signal block, the pass loss of which is lower than the threshold, selecting the synchronization signal block with the smallest path loss.

In addition, the preamble target receiving power is computed as follows:

PREAMBLE_RECEIVED_TARGET_POWER= preambleInitialReceivedTar getPower_k+DELTA_PREAMBLE+(POWER_RAMPING_COUNTER−1)*powerRampingStep;

wherein PREAMBLE_RECEIVED_TARGET_POWER is the computed preamble target receiving power, preambleInitialReceivedTargetPower_k is the initial target preamble receiving power configured in the kth selected synchronization signal block, DELTA_PREAMBLE is the power control parameters related to the preamble format, POWER_RAMPING_COUNTER is the power ramping counter, which is used to record the number of power rampings, and powerRampingStep is the power ramping compensation, which is configured in the random access configuration information.

After acquiring the preamble target receiving power, the transmit power for transmitting the random access preamble is computed according to the maximum transmit power limit and the power loss, as follows:

PPRACH=min{PCMAX,PREAMBLE_RECEIVED_ TARGET_POWER+PL k} [dBm]

wherein PCMAX is the maximum transmit power of the terminal and PLk is the computed path loss of the kth synchronization signal block.

It should be noted that the random access configuration information (including random access channel configuration information, preamble resources and initial target preamble receiving power configuration information) in this embodiment is transmitted in a Media Access Control (MAC) layer. After the MAC computes the receiving power of the target preamble, the target preamble is transmitted to the physical layer, and the physical layer computes the final transmit power for random access preamble transmitting.

For the case where the power ramping counter is larger than 1, that is, for the case where the previous random access attempt fails and the random access process attempt is re-initiated, it is necessary to first determine whether it is necessary to switch the time-frequency resources of the random access occasion according to the latest measurement result. Specifically, the terminal determines whether the currently selected synchronization signal block still meets the predetermined synchronization signal block selection criteria according to the latest measurement result. For example, a predetermined threshold is set, and if the reference signal receiving power is lower than the threshold, it is deemed that the synchronization signal block is no longer suitable, and the synchronization signal block is re-selected according to the forgoing criteria: or, a predetermined criterion is set, if the computed path loss is higher than the threshold, it is deemed that the synchronization signal block is no longer suitable, and the synchronization signal block is re-selected according to the forgoing criterion.

If the synchronization signal block is re-selected when the random access is re-attempted, it is necessary to re-select the time-frequency resources and preamble resources of the random access occasion according to the configuration information (including the random access configuration information and the transmit power configuration information) of the synchronization signal block, and re-compute the transmit power of the random access preamble, and transmit the preamble using the re-computed transmit power of the random access preamble on the re-selected random access occasion.

It should be noted that in this embodiment, the transmit power information, random access configuration information and other random access related configuration information of the synchronization signal block can also be transmitted in OSI.

Embodiment 5

In this embodiment, a method for configuring a transmit power of a random access preamble will be introduced in combination with a specific system. In this embodiment, the transmit power of the random access occasion corresponding to synchronization signal blocks with different transmit powers is adjusted by configuring power control parameters.

One possible implementation is to carry power control parameters in random access configuration information, and synchronization signal blocks with different transmit powers are configured with different power control parameters, which are used to adjust path loss computation of different random access occasions.

Specifically, the power control parameters are carried in the random access configuration information to adjust the transmit power of the random access preamble. In this embodiment, the indication of the transmit power of the synchronization signal block can still be transmitted in the RMSI or OSI, for example, in the way adopted in the previous embodiment. The difference is that in this embodiment, the indication of the transmit power of the synchronization signal block can adopt a rough configuration way. For example, using only two bits to indicate the transmit power of the synchronization signal block or informing the configuration and indication of the transmit power of the synchronization signal block within a larger group.

The initial target preamble receiving power parameters carried in the random access configuration information can still be configured according to the synchronization signal block, synchronization signal block grouping or random access timing grouping in the way described in Embodiment 4. The difference is that it is possible to adopt a rough configuration way, for example, a configuration way with a larger quantization interval or a configuration way with more synchronization signal blocks in the group.

At the same time, the random access configuration information carries power configuration parameters. This parameter can be configured on a synchronization signal block, that is, different synchronization signal blocks are configured with the same or different power configuration parameters. An index table can be used for configuration. A simple example is shown in Table 8.

TABLE 8 schematic diagram of power control parameters

| Index | Power control parameter (dB) |
|---|---|
| 0 | −3 |
| 1 | −1 |
| 2 | 0 |
| 3 | 1 |

The index table are both known by the terminal and the base station, and the base station configures corresponding power control parameters by informing the index, and the terminal obtains the power control parameters corresponding to the corresponding index by looking up the table.

In other configuration ways, the configuration of power control parameters is performed in a direct quantization way, that is, the quantization of power control parameters at certain quantization intervals is adopted, and the quantized power control parameters are configured.

This configuration parameter can be transmitted in the RMSI or OSI or in random access configuration information in the way of parameter sequence. That is, a parameter sequence having a length consistent with the number of synchronization signal blocks is established, wherein each element represents the power control parameters of the synchronization signal block configuration of the corresponding index. A simple example is to set up a parameter sequence with a length of 8 for a system with 8 synchronization signal blocks: [c0, . . . , c7], wherein ci, $0 \leq i \leq 7$ is the power control parameters of the ith synchronization signal block.

Adopting the way that each synchronization signal block is configured may cause a larger signaling overhead. In addition to configuring power control parameters independently for synchronization signal blocks, another possibility is to group synchronization signal blocks and configure power control parameters in the way of grouping. The way of grouping can refer to the way described in Embodiment 3 or Embodiment 4.

The parameters added in this embodiment can be used to compute the target receiving power in the MAC layer, or transmitted to the physical layer for directly adjusting the transmit power of the random access preamble.

If the target receiving power is computed in MAC layer, the configuration information provided in the RMSI or OSI includes the target receiving power adjustment parameters to adjust the target receiving power computed in MAC layer, thus indirectly adjusting the path loss computed by the terminal. Specifically, assuming that the target receiving power adjustment parameter is expressed by Adjust_Preamble_Power, the computation formula of the target receiving power of the MAC is:
PREAMBLE_RECEIVED_TARGET_POWER=
preambleInitialReceivedTar getPower+DELTA_PREAMBLE+(POWER_RAMPING_COUNTER−)*powerRampingStep+Adjust_Preamble_Power;

In the above formula, the parameter preambleInitialReceivedTargetPower can be notified on the synchronization signal block, or can be configured and notified according to the grouping of synchronization signal blocks. Similarly, the parameter Adjust_Preamble_Power can also be notified on the synchronization signal block, or can be configured and notified according to the grouping of synchronization signal blocks. The preamble target receiving power is obtained by computing the above parameters, which is transmitted to the physical layer by the MAC layer, and the transmit power of the random access preamble is computed by combining the computed path loss.

If the transmit power of the random access preamble is adjusted in the physical layer, the configuration information provided in the RMSI or OSI includes the transmit power adjustment parameters of the preamble, which needs to be transmitted to the physical layer through a higher layer, and the transmit power of the random access preamble is adjusted by the physical layer. Specifically, the preamble target receiving power computed by the MAC layer is transmitted to the physical layer, and the physical layer computes the path loss according to the measurement results, high-layer transmitting or the preset transmit power of the synchronization signal block, and computes the transmit power of the random access preamble according to the power adjustment parameters. The specific formula is described as follows:

$$PPRACH=\min\{PCMAX, PREAMBLE\_RECEIVED\_TARGET\_POWER+PL\ k+\delta k\}\ [dBm]$$

wherein $\delta k$ is the power adjustment parameter configured for the kth synchronization signal block. The above formula assumes that the terminal selects the kth synchronization signal block and performs a random access process on the corresponding random access occasion.

In this embodiment, the behavior of the terminal can be similar to that of the previous embodiment, and can be briefly described as follows:

The terminal performs the initial access process, detects the synchronization signal block, and reads the content of the primary information block carried by the broadcast channel. According to the received power of the detected reference signal and the predetermined criteria, a suitable synchronization signal block is determined.

Reading the RMSI or OSI indicated by the primary information block, acquiring random access channel configuration information therein, and determining time-frequency resources of the random access occasion and the random access preamble according to the random access channel configuration information.

According to the synchronization signal block power configuration information in the RMSI or OSI, the transmit power of the selected synchronization signal block is acquired, and the path loss is computed according to the measured reference signal receiving power of the synchronization signal block. The path loss is computed as follows: Path loss (dB)=transmit power (dBm)-reference signal receiving power (dBm).

The terminal computes the preamble target receiving power according to the configuration information of the initial target preamble receiving power in the random access configuration information and the information such as the random access power ramping counter. Combining the computed path loss, the transmit power of random access preamble can be acquired. Using this transmit power, the determined random access preamble is transmitted in the random access channel determined in the previous step.

Figure 24:
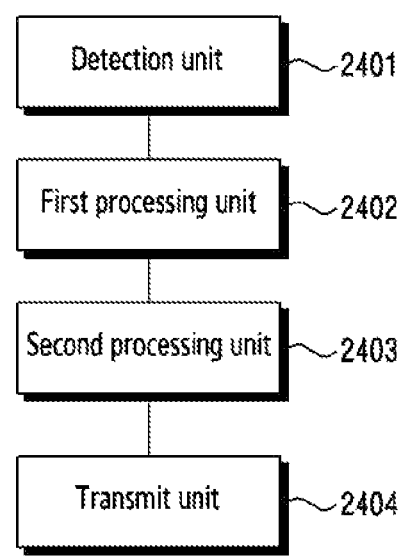
FIG. 24 illustrates a structural diagram of an apparatus for transmitting a random access preamble according to various embodiments of the present disclosure.
Figure 25:
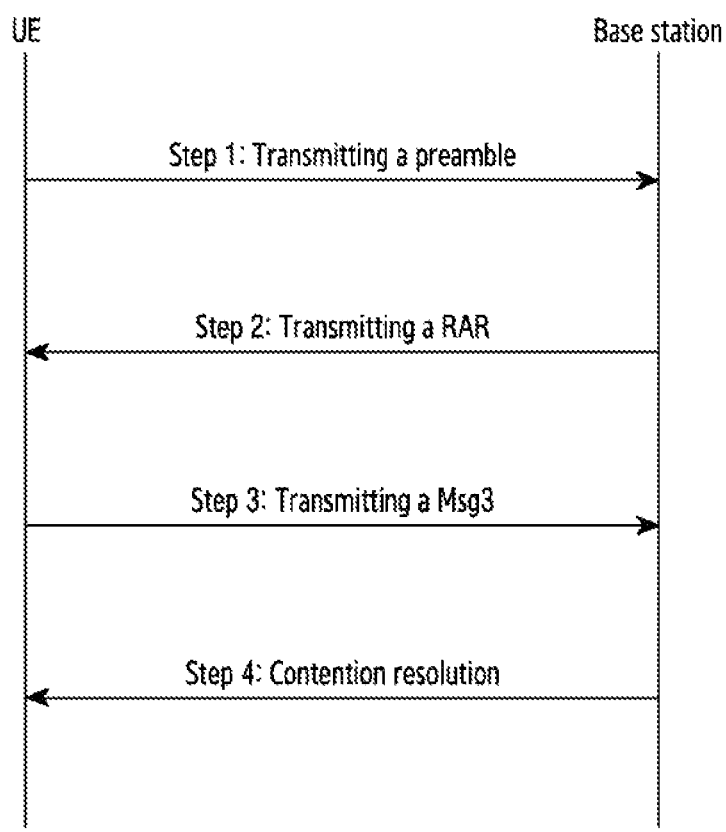
FIG. 25 illustrates a schematic flowchart of a traditional contention-based random access.

The disclosure also provides an apparatus for transmitting a random access preamble, as shown in FIG. 24, which comprises:

a detection unit 2401 configured to detect a synchronization signal block to obtain a reference signal receiving power;

a first processing unit 2402 configured to determine a target synchronization signal block according to the reference signal receiving power, and acquire configuration information carried in the target synchronization signal block;

a second processing unit 2403 configured to determine a random access channel and a random access preamble according to the configuration information, and determine the transmit power of the random access preamble according to the configuration information and the reference signal receiving power; and a transmit unit 2404 configured to transmit the random access preamble on the random access channel according to the transmit power.

Based on the method and apparatus provided by the present disclosure, different transmit powers of different transmit beams (corresponding to different synchronization signal blocks) in a 5G multi-beam operating system can be adapted, and different transmit powers can be configured with a lower signaling overhead, thereby improving system flexibility and terminal experience.

It should be understood by a person of ordinary skill in the art that term "terminal" and "terminal apparatus" as used herein include not only apparatuses with a wireless signal receiver having no emission capability but also apparatuses with receiving and emitting hardware capable of carrying out bidirectional communication over a bidirectional communication link. Such apparatuses can include cellular or other communication apparatuses with a single-line display or multi-line display or the same without a multi-line display; Personal Communication Service (PCSs) with combined functionalities of speech, data processing, facsimile and/or data communication; Personal Digital Assistants (PDAs), which can include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (aviation, marine and/or land transportations), or suitable and/or configured to run locally and/or distributed in other places in the earth and/or space for running. The "terminal" or "terminal apparatus" as used herein may further be a communication terminal, an internet terminal, a music/video player terminal. For example, the terminal may be a PDA, a Mobile Internet Device (MID) and/or a mobile phone with a music/video playback function, or may be apparatuses such as a smart TV and a set-top box.

On the one hand, in the existing 5G standard discussion, the communication system uses a beamforming method. In this method, after a plurality of users read same random access response(s), they will transmit the Msg3 on a same uplink resource, and in terms of the receiving end (i.e., the base station), it is possible to decode the Msg3 of the plurality of users successfully and obtain different UE IDs (i.e., user equipment unique identifiers) for the plurality of users. In a traditional communication system, the base station can only transmit a contention resolution message for a single user in message 4, that is, the base station can only access one user. After the user successfully searches for and decodes message 4, it is determined that the UE ID which is the same as the UE ID uploaded in Msg3, then, the access is considered to be successful, a Temporary Cell-Radio Network Temporary Identifier (TC-RNTI) is set as the C-RNTI, and an acknowledgment is transmitted to the base station. If it is necessary to support access by multiple users in message 4, the problems to be solved include how to solve the allocation of C-RNTI, how to indicate the resource indication for feeding back an uplink ACK for message 4, and the like.

Based on the foregoing technical problems to be solved, the Embodiment 6 of the present disclosure provides a random access method. Based on the random access method provided in the Embodiment 6 of the present disclosure, after a user reads a random access response and transmits a message 3, the TC-RNTI obtained in the random access response is used to detect the downlink control information. When an ACK message transmitted by the base station is received, the ACK message indicates that the base station successfully receives the user's message 3, and the UE will find the message 4 transmitted by the base station, and find the corresponding Control Element (MAC CE) carrying the UE ID uploaded by the user in message 3 from the Medium Access Control Protocol Data Unit (MAC PDU). In order to correspond to the UE IDs of different users, it is necessary to allocate C-RNTIs for different users and indicate the uplink resource position for subsequent transmitting ACKs in the message 4. Specifically, the new C-RNTI and the uplink resource indication of the ACK may be notified to the user by expanding or adding the MAC CE, or the Service Data Unit (SDU) in the message 4 may carry the foregoing information.

Figure 26:
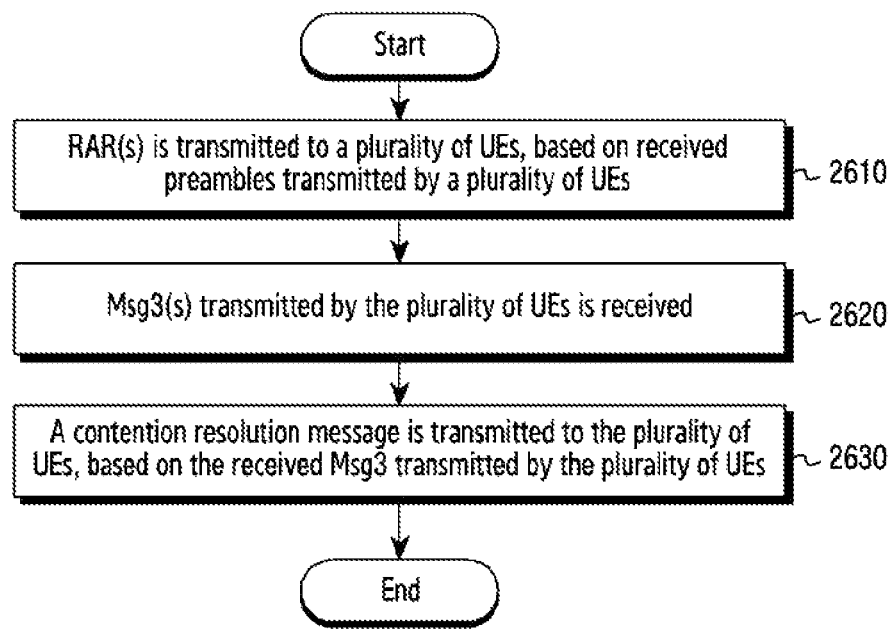
FIG. 26 illustrates a schematic flowchart of a random access method according to Embodiment 6 of the present disclosure.

Specifically, the flowchart of the random access method provides by the Embodiment 6 of the present disclosure is as shown in FIG. 26, and the method includes: Step 2610: random access response(s)(RAR(s)) is transmitted to a plurality of UEs, based on received preambles transmitted by the plurality of UEs; Step 2620: Msg3(s) transmitted by the plurality of UEs is received; and Step 2630: the contention resolution message is transmitted to the plurality of UEs, based on received Msg3(s) transmitted by the plurality of UEs.

The embodiment of the present disclosure provides a random access method. The random access method includes: RAR(s) is transmitted to a plurality of UEs, based on received preambles transmitted by the plurality of UEs; Msg3(s) transmitted by the plurality of UEs is received, which provides necessary guarantees for subsequent transmitting of a contention resolution message to the plurality of UEs; and a contention resolution message is transmitted to the plurality of UEs, based on the received Msg3 transmitted by the plurality of UEs. The method can enable the base station to transmit the contention resolution message to the plurality of different UEs at the same time. The method provides a reliable guarantee for multiple users to access the base station and perform data transmission at the same time based on the received contention resolution message, and effectively avoids the situation that the base station transmits the contention resolution message to only one user and only one user is accessed thereto.

Preferably, the transmitting of the contention resolution message to the plurality of UEs includes transmitting of the contention resolution message to the plurality of UEs through the MAC PDU; the contention resolution message includes UE contention resolution identities of the plurality of UEs and/or C-RNTI and/or HARQ feedback resource indication allocated for UEs.

Preferably, the transmitting of the contention resolution message to the plurality of UEs through the MAC PDU includes at least one of the following situations:
transmitting of the contention resolution message to the plurality of UEs by carrying the UE contention resolution identities of the plurality of UEs and/or the C-RNTI and/or the HARQ feedback resource indication allocated for the plurality of UEs in a MAC CE of the MAC PDU;
transmitting of the contention resolution message to the plurality of UEs by carrying the plurality of UE contention resolution identities of the plurality of UEs in the first MAC CE of the MAC PDU and carrying the C-RNTI and/or the HARQ feedback resource indication allocated for the plurality of UEs in a second MAC CE of the MAC PDU;
transmitting of the contention resolution message to the plurality of UEs by carrying the plurality of UE contention resolution identities of the plurality of UEs in the MAC CE of the MAC PDU and carrying the C-RNTI and/or the HARQ feedback resource indication allocated for the plurality of UEs in a MAC SDU of the MAC PDU.

Preferably, the second MAC CE is subsequent to and adjacent to the first MAC CE.

Further, in the Embodiment 6 of the present disclosure, in order to correspond to the UE IDs of different users, it is necessary to allocate C-RNTIs for different users and to indicate the uplink resource position for subsequent transmitting ACKs in the message 4. Embodiment 6 can include the following the implement manners.

Figure 27:
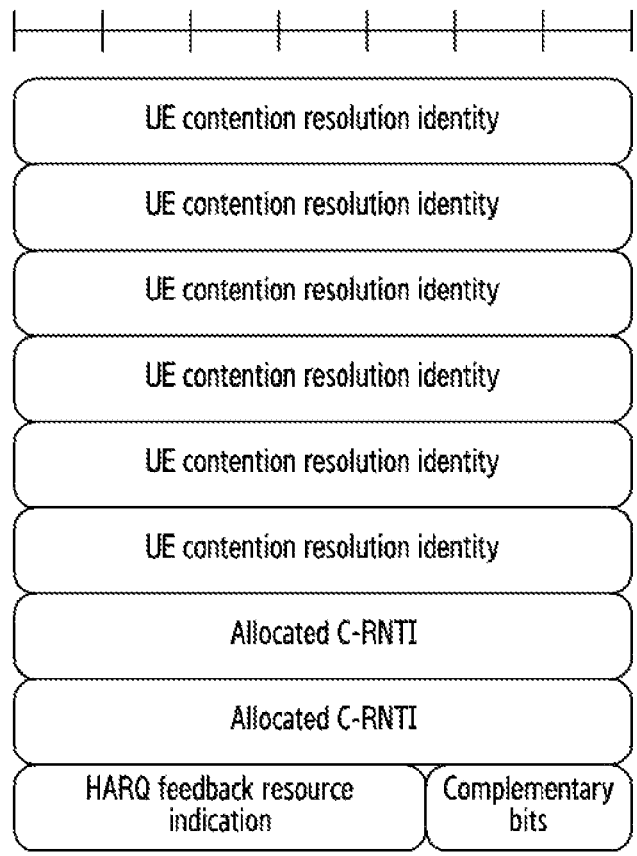
FIG. 27 illustrates an exemplary diagram of extending an existing UE contention resolution identity MAC CE according to Embodiment 6 of the present disclosure.

First, only the format of the MAC CE is modified. As shown in FIG. 27, the UE reads the MAC PDU subheader, wherein, if the logical channel identifier (LCID) indicates the MAC CE type corresponding to the user is "UE Contention Resolution Identity", the UE needs to determine whether the UE contention resolution identity contained in content of the MAC CE is matched with the UE ID in message 3 transmitted by the user when the user reads the content of the MAC CE. Wherein,
  a) If they are matched, the user uses the allocated C-RNTI obtained from the MAC CE as the C-RNTI used after accessing the network itself; UE reads the HARQ feedback resource indication therefrom to determine the resource for transmitting the uplink HARQ feedback, and transmits an ACK signal. The ACK/NACK (Acknowledgment/Non-Acknowledgment) resource indication includes the position of the time-frequency resource for transmitting the uplink HARQ feedback, and the sequence number of the possible sequence, similar to the sequence number of computer-generated sequence (CGS) used in LTE.
  b) If they are not matched, then the user contention resolution is failed. If the maximum number of random access preamble transmissions is not exceeded, the user continues to transmit message 1 and continues the random access process.

Secondly, a MAC CE is added, that is, the user reads the LCID indicating the "UE contention resolution identity" and the LCID indicating the "allocated C-RNTI and/or HARQ feedback resource indication" respectively in the subheader of the MAC PDU, and corresponding information is found in the corresponding MAC CE; as shown in the Table 9, except for the LCID index corresponding to the UE contention resolution identity, a separate LCID index is newly added for "the allocated C-RNTI and/or HARQ feedback resources indication", and 01011 in the table is an example. It can also be other values.

TABLE 9

The values of LCID of the downlink sharing channel

| Index | LCID value |
| --- | --- |
| . . . . . . . | . . . . . . . |
| 11100 | UE contention resolution identity |
| 01011 | Allocated C-RNTI and/or HARQ feedback resources indication |
| . . . . . . . | . . . . . . . |

Figure 28:
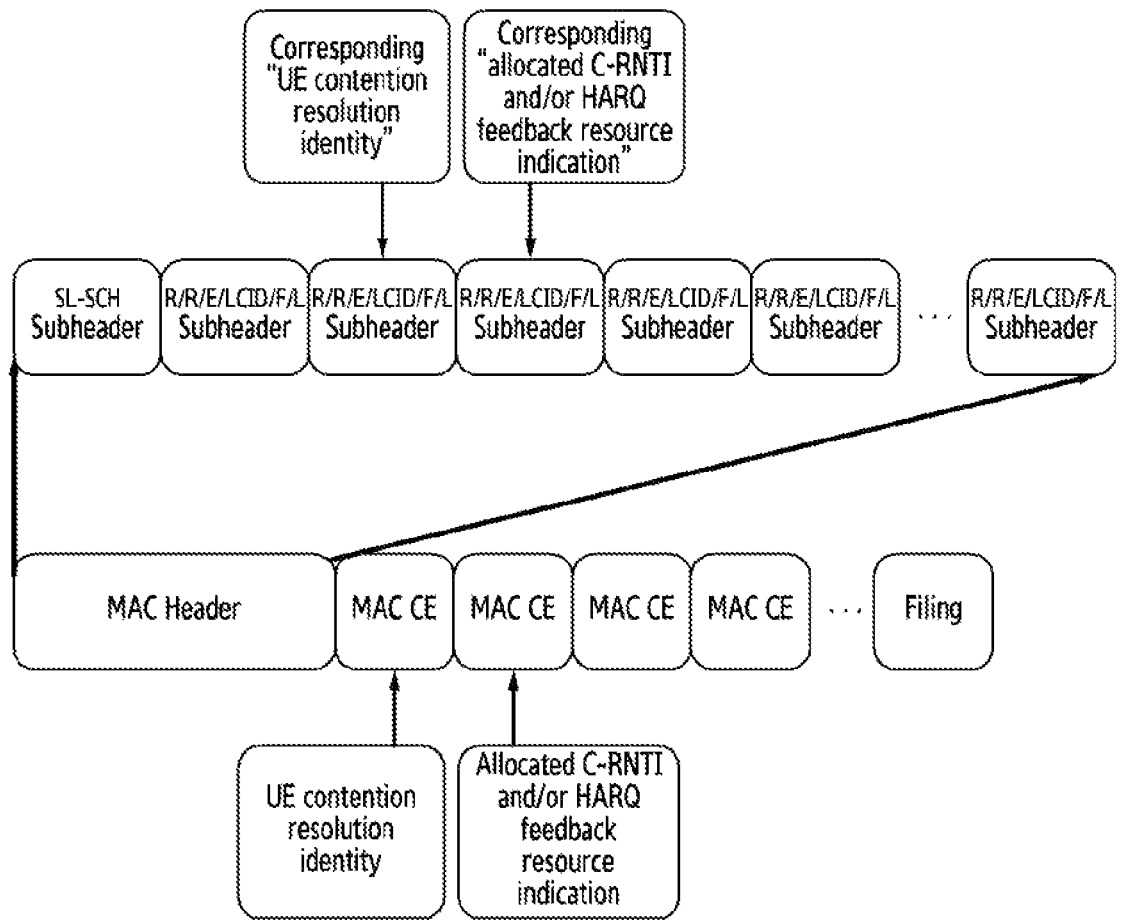
FIG. 28 illustrates an exemplary diagram of adding a separate MAC CE indication according to Embodiment 6 of the present disclosure.

In the example of FIG. 28, the user reads the LCID of "UE contention resolution identity" and the LCID of "allocated C-RNTI and/or HARQ feedback resource indication" in the MAC header and reads the corresponding value in the corresponding MAC CE. If the read UE contention resolution identity by user matches the UE ID transmitted in message 3 by itself, then it is considered that the contention resolution is successful and UE reads "allocated C-RNTI and/or HARQ feedback resources indication" in the next MAC CE that follows, to set its own C-RNTI and obtain the HARQ feedback resource indication.

Third, the "allocated C-RNTI and/or HARQ feedback resource indication" is directly added into the UE's MAC SDU.

The difference between the third manner and the first manner is that in the third manner, the "allocated C-RNTI and/or HARQ feedback resource indication" isn't carried in the MAC CE, but be added into the other MAC SDUs of the user.

On the other hand, in the new communication system standard discussion, the communication system uses a beamforming method. In this method, after a plurality of users read a same random access response, they will transmit Msg3(s) on a same uplink resource, and in terms of the receiving end (i.e., the base station), it is possible to decode the Msg3 of the plurality of users successfully and obtain different UE LDs (i.e., UE unique identifiers) for multiple users. In a traditional communication system, the base station can only transmit a contention resolution message for a single user in message 4, that is, the base station can only access one user. After the user initial accessed successfully searches for and decodes message 4, it is determined that the UE ID in message 4 is the same as the UE ID uploaded in Msg3, then, the access is considered to be successful, a Temporary Cell-Radio Network Temporary Identifier (TC-RNTI) is set as the C-RNTI, and an acknowledgment is transmitted to the base station. After reading the random access response and transmitting the message 3, the TC-RNTI obtained in the random access response is used to detect the downlink control information. When receiving the ACK message transmitted by the base station (it indicates that the base station receives the message 3 of the user successfully), the UE will find the message 4 transmitted by the base station, and find the UE ID uploaded by the user in the message 3 carried by the corresponding MAC CE from the MAC PDU therein. The UE ID may be the SAE-Temporary Mobile Subscriber Identity (S-TMSI) of the UE, the C-RNTI, a random number, and the like.

Since the base station allocates C-RNTI and indicates an uplink resource location for subsequent transmitting ACK for a plurality of different users, in order to correspond to UE IDs of the plurality of different users, the user searches for or decodes the message 4 and detects whether the process of contention solution being successful also needs to be adjusted accordingly.

Figure 29:
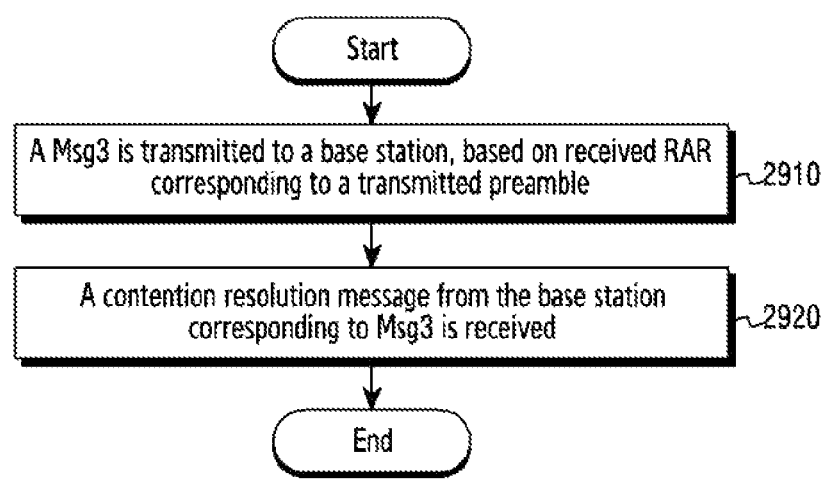
FIG. 29 illustrates a schematic flowchart of a random access method according to Embodiment 7 of the present disclosure.

Based on this, the Embodiment 7 of the present disclosure provides a random access method, and the specific flow is as shown in FIG. 29, including: Step 2910, a Msg3 is transmitted to a base station, based on received RAR corresponding to a transmitted preamble; Step 2920, a contention resolution message from the base station corresponding to Msg3 is received.

The embodiment of the present disclosure provides a random access method. The random access method includes: a Msg3 is transmitted to the base station, based on received RAR corresponding to a transmitted preamble, which provides necessary guarantees for subsequent the plurality of UEs receiving of the contention resolution message transmitted by the base station; and the contention resolution message from the base station corresponding to Msg3 is received. The method can enable the plurality of UEs receive the contention resolution message transmitted by the base station at the same time. It provides a reliable guarantee for multiple users to access the base station and perform data transmission at the same time based on the received contention resolution message, and effectively avoids the situation that the base station transmits the contention resolution message to only one user and only one user is accessed thereto.

Preferably, the method further includes: detecting of a Physical Downlink Control Channel (PDCCH) to determine whether a contention resolution is successful; wherein, the way of determining whether the contention resolution is successful includes at least one of the following:

under a first preset condition, if the PDCCH information is detected based on the C-RNTI obtained by the UE, and the PDCCH information includes an uplink grant to transmit new data, it is determined that the contention resolution is successful;

under a second preset condition, if the PDCCH information is detected based on the C-RNTI obtained by the UE, it is determined that the contention resolution is successful; and under a third preset condition, if the PDCCH information is detected based on temporary C-RNTI obtained by the UE, then the UE contention resolution identity obtained based on decoded MAC PDU determines whether the contention resolution is successful.

Preferably, the first preset condition includes: UE carries the C-RNTI in the Msg3, and the random access process is triggered based on a MAC sublayer and Radio Resource Control (RRC) sublayer;

the second preset condition includes: UE carries the C-RNTI in the Msg3, and the random access process is triggered based on a PDCCH order; and the third preset condition includes: UE carries the UE identifier in the Msg3, and the UE identifier is reported through a Common Control Channel Service Data Unit (CCCH SDU).

Preferably, the UE contention resolution identity obtained based on the decoded MAC PDU determines whether the contention resolution is successful, if the MAC PDU includes the first MAC CE for indicting the plurality of UE contention resolution identities, includes:

Detecting of whether any UE contention resolution identity in the first MAC CE is the same as the preset number of bits of a preset position in the CCCH SDU carried in the Msg3;

determining that the contention resolution is successful, if they are the same; and retransmitting the preamble, if they are not the same and not exceed a maximum transmission times of the preamble.

Preferably, if the first MAC CE is also used for indicating the C-RNTI and/or the HARQ feedback resource indication allocated for the UE, after the determining that the contention resolution is successful, the method further includes:

obtaining of the C-RNTI and/or the HARQ feedback resource indication allocated for the UE in the first MAC CE.

Preferably, if the MAC PDU includes the first MAC CE for indicting the plurality of UE contention resolution identities and the second MAC CE for indicating the C-RNTI and/or the HARQ feedback resource indication allocated for the UE, after the determining of the contention resolution being successful, the method further includes:

obtaining of the C-RNTI and/or the HARQ feedback resource indication allocated for the UE in the second MAC CE.

Preferably, if the MAC PDU includes the first MAC CE for indicting the plurality of UE contention resolution identities and the MAC SDU for indicating the C-RNTI and/or the HARQ feedback resource indication allocated for the UE, after the determining of the contention resolution being successful, the method further includes:

obtaining of the C-RNTI and/or the HARQ feedback resource indication allocated for the UE in the MAC SDU.

Preferably, the HARQ feedback resources indication includes uplink resource configuration information, wherein, the uplink resource configuration information includes at least one of the following:

a time position, a frequency-domain position and sequence information;

wherein, the time position includes any one of the following:

a time unit index, a relative position relative to a known time unit position;

the frequency domain position includes any one of the following:

a frequency domain unit index, a relative position relative to a known frequency domain unit position;

the sequence information includes:

sequence index information used for generating the Physical Uplink Control Channel (PUCCH) by the UE.

Preferably, the way of detecting of the PDCCH includes any one of the following:

if a negative acknowledgment message NACK is detected in the PDCCH search space based on the C-RNTI or the temporary C-RNTI, searching for the uplink grant in the PDCCH search space or in a PDCCH search space after the preset time interval, based on the used C-RNTI or the temporary C-RNTI, to retransmit the Msg3;

if an acknowledgment message ACK is detected in the PDCCH search space based on the C-RNTI or the temporary C-RNTI, searching for PDCCH information carrying contention resolution message in the PDCCH search space or in a PDCCH search space after the preset time interval based on the used C-RNTI or the temporary C-RNTI;

if the uplink grant for retransmitting the Msg3 is not detected in the PDCCH search space based on the C-RNTI or the temporary C-RNTI, redetecting of the PDCCH information carrying contention resolution message in the PDCCH search space based on the used C-RNTI or the temporary C-RNTI;

if the PDCCH information carrying contention resolution message is not detected in the PDCCH search space based on the C-RNTI or the temporary C-RNTI, redetecting of the uplink grant for retransmitting the Msg3 in the PDCCH search space or a PDCCH search space after the preset time interval based on the used C-RNTI or the temporary C-RNTI.

In the following, the random access method of the embodiment of the present disclosure is described in detail in conjunction with the resource configuration in the message 4 of the base station. For convenience of description, this embodiment will be described in the case where two UEs collide, but the way of configuration can be extended to the case where multiple users collide or no collision.

Message 1: UE1 and UE2 select the same random access time-frequency resource (i.e., PRACH) and select the same random access preamble (preamble1), and launch random access to the base station;

Message 2: The base station detects preamble1, but the base station cannot confirm that the preamble1 is the result of collision of multiple UEs. It can only prepare a random access response for the preamble1 by default. In the random access response message, the Temporary Cell Radio Network Temporary Identifier (TC-RNTI) is configured for possible access users, as well as the timing advance information and the uplink grant for transmitting message 3; UE1 and UE2 search the same random access response message by using the same Random Access Radio Network Temporary Identifier (RA-RNTI). The random access radio network temporary identifier searches for the same random access response message. Because the random access preamble sequence identifiers (RAPIDs) selected by the two UEs are also the same, both UEs consider that the random access response sent by the base station is sent to themselves, then both UEs will read the uplink grant and the timing advance contained in the RAR to transmit message 3:

Message 3: In message 3, UE1 and UE2 will transmit their own UE ID to the base station. In the beamforming system, signals arrive at the base station through different channels, because of the different locations of UE1 and UE2. Once the base station can decode the messages 3 transmitted by UE1 and UE2 respectively, for example, when the base station has a distributed antenna configuration, the signal of UE1 received by antenna 1 is stronger, the message 3 of UE1 is decoded, and the signal of UE2 received by antenna 2 is stronger, the message 3 of UE2 is decoded. Therefore, on the base station side, it can be considered as both UEs are detected by the base station.

For the UE, after transmitting the message 3, the UE starts a MAC-Contention Resolution Timer or restarts a MAC-Contention Resolution Timer; meanwhile, the UE needs to detect the downlink control channel, to determine whether the competition solution is successful.

The embodiments of the present disclosure provide the following multiple implementation manners for detecting the downlink control channel:

1. The UE detects a non-acknowledgment message NACK in the downlink control channel search space by using the C-RNTI or the TC-RNTI, and the UE continues to search a possible uplink grant in the present search space or the next search space or a search space after a preset interval based on the used C-RNTI or the temporary C-RNTI, in order for the retransmission of Msg3; or, 2. The UE detects an acknowledgment message ACK in the downlink control channel search space by using the C-RNTI or TC-RNTI, and the UE continues to search a possible PDCCH carrying message 4 in the present search space or the next search space or a search space after a preset interval based on the used C-RNTI or the temporary C-RNTI; or, 3. The UE detects uplink grant for retransmission of message 3 in the downlink control channel search space by using the C-RNTI or TC-RNTI; if the uplink grant is not detected, the UE redetects a possible PDCCH carrying message 4 in the search space or a search space after a preset interval based on the used C-RNTI or the TC-RNTI; wherein, the UE may detect a possible PDCCH carrying message 4 in the downlink control channel search space by using C-RNTI or the TC-RNTI firstly, if it is not detected, UE redetects uplink grant in the search space or a search space after a preset interval based on the used C-RNTI or the TC-RNTI, in order for the retransmission of Msg3.

At the same time, the manner for determining whether the contention resolution is successful in the embodiment of the present disclosure includes:

1. While the UE includes a C-RNTI (that is, the UE is a connected UE) in the message 3 and the random access process is triggered by a MAC sublayer or a RRC sublayer, it is determined that the contention resolution is successful when the UE detects PDCCH information successfully including uplink grant for new data by using the obtained C-RNTI; or, 2. While the UE includes a C-RNTI in message 3 (that is, the UE is a connected UE) and the random access process is triggered by a PDCCH order, it is determined that the contention resolution is successful when the UE detects PDCCH information successfully by using the obtained C-RNTI.

In both of the above cases, the UE can consider that the contention resolution is successful; the MAC contention resolution timer can be stopped, and the Temporary C-RNTI allocated by the base station can be ignored.

3. While the UE includes a UE ID reported by Common Control Channel Service Data Unit (CCCH SDU) in message 3, the PDCCH information is detected by the obtained TC-RNTI, and a Message 4 is found, the UE determines that the contention resolution is successful based on the decoded MAC PDU, when the UE successfully decodes the MAC PDU of message 4, then the UE stops the MAC contention resolution timer.

Figure 30:
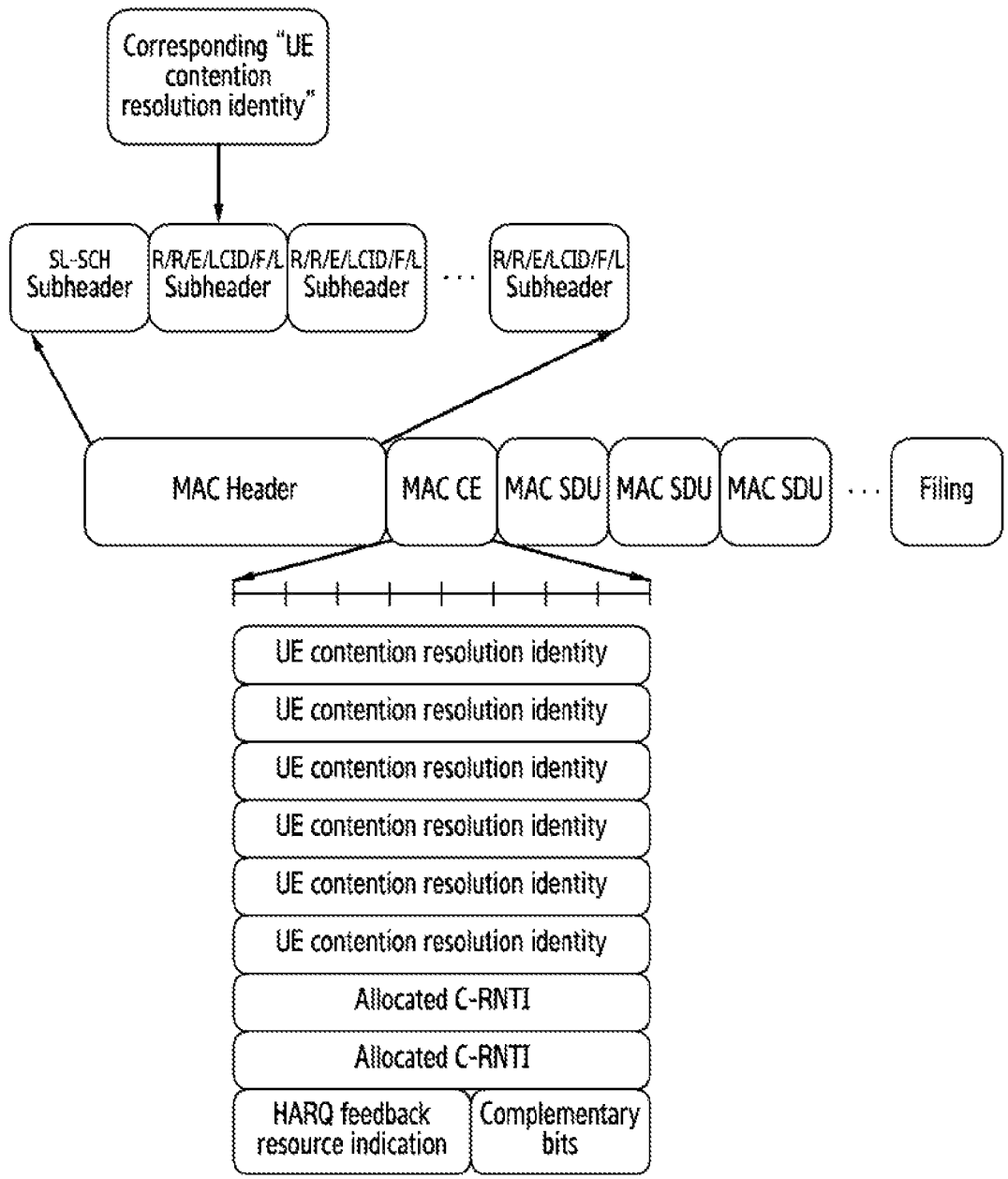
FIG. 30 illustrates an exemplary diagram of UE reading contention resolution identity MAC CE according to Embodiment 7 of the present disclosure.

Specifically, when the UE detects the PDCCH information through the TC-RNTI in the message 3, it is based on the UE contention resolution identity obtained by decoding the MAC PDU to determine whether the contention resolution is successful, wherein the UE determine whether the competition solution is successful based on the UE contention resolution identity obtained by decoding MAC PDU, including the following situations:

1 When the MAC PDU decoded by the UE includes the MAC CE for indicating the UE contention resolution identity, the UE will compare the UE contention resolution identity (N bits, such as 48 bits in LTE) in the MAC CE with the first N bits (or the last N bits, or the N bits of the specified position) in the CCCH SDU uploaded in message 3 by the UE, as shown in FIG. 30.

a) If the comparison is positive, the UE may consider its own contention resolution to be successful and continue to read the C-RNTI value as allocated by the base station in the same MAC CE; wherein if the UE does not find the C-RNTI value, or the C-RNTI value is set as a preset value (for example, all 0, or all 1, or a specified value), the UE directly sets the TC-RNTI as a C-RNTI; otherwise the UE sets the read allocated C-RNTI value as its own C-RNTI; and/or, The uplink resource configuration information used for transmitting the feedback information (ACK) of the message 4, i.e., the HARQ feedback resource indication, and the HARQ feedback resource indication includes the uplink resource configuration information; wherein the configuration information of the uplink resource should include at least one of the following:

i. Time position
1) The time position may be a specific time unit index, wherein the time unit position may be, for example, symbol index, slot index, mini slot index, symbol group index, subframe index, half subframe index, radio frame index;
2) The time position may also be a relative position relative to a known time unit position, such as M time unit positions subsequent to the time unit position where the common search space is located; or M time unit positions subsequent to the time unit position where message 4 is located.

ii. Frequency domain position
1) The frequency domain position may be a specific frequency domain unit index position, wherein the frequency domain unit position may be, for example, a subcarrier index, a subcarrier group index, a physical resource block index (PRB index), a physical resource block group index, and the like;
2). The frequency domain position may also be a relative position relative to a known frequency-domain unit position, such as M frequency-domain unit positions relative to a frequency-domain unit position where the common search space is located, or M frequency-domain unit positions relative to the frequency-domain unit position where message 4 is located;

iii. Sequence information
The sequence information may be sequence index information used by the UE to generate a PUCCH.

Figure 31:
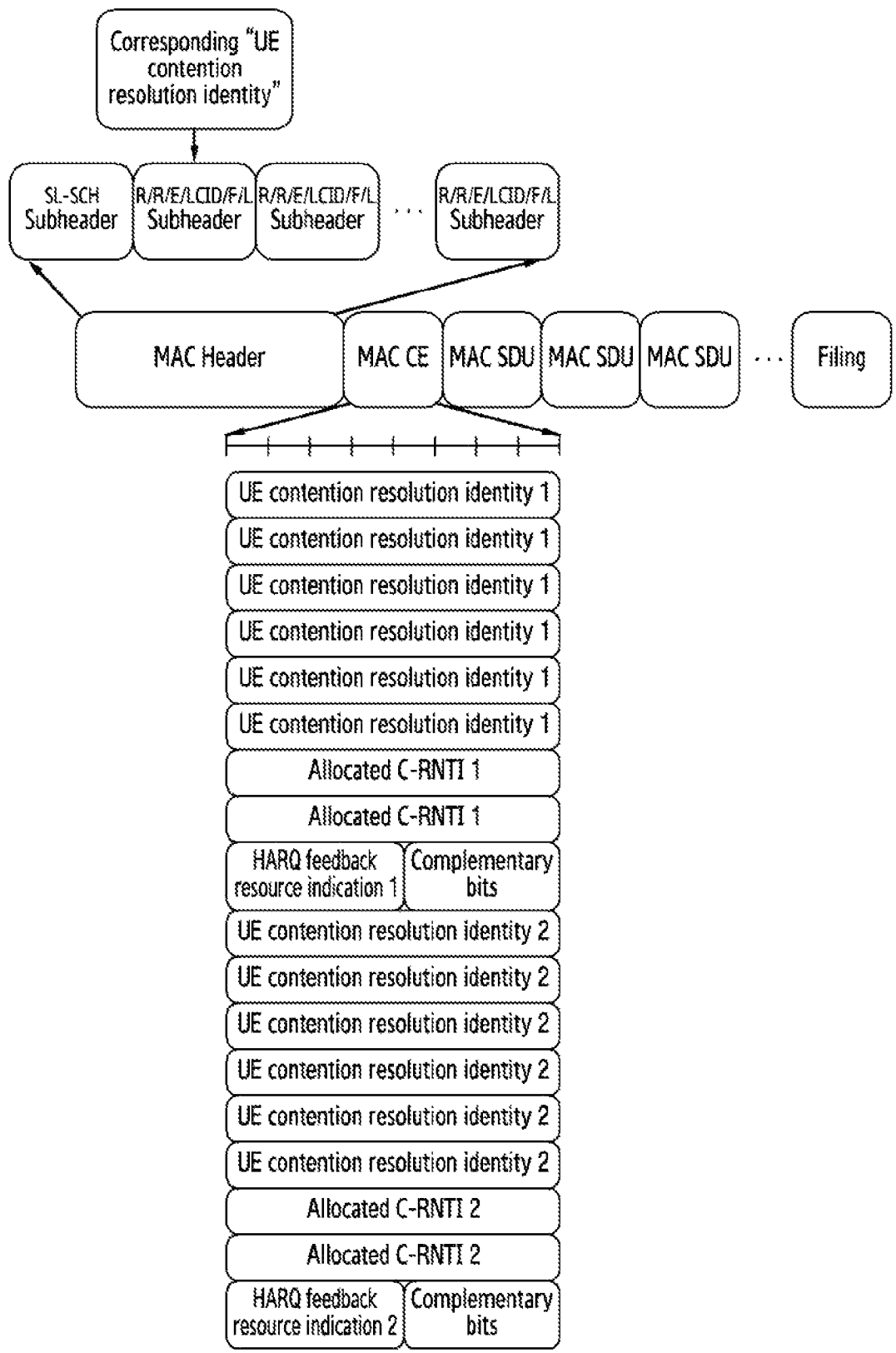
FIG. 31 illustrates an exemplary diagram of UE reading (a plurality of) contention resolution identity MAC CEs according to Embodiment 7 of the present disclosure.

It should be noted that if time position information and/or frequency domain position information and/or sequence information have been configured in a broadcast message or other downlink channel (as in message 2), in message 4, only the rest of information need to be configured, for example, the uplink time unit position and the frequency domain unit position for transmitting feedback have been configured in the system broadcast information.

b) If the comparison is negative, the UE continues to compare other positions in the MAC CE that contain the UE contention resolution identity. As shown in FIG. 31, the UE may correctly match with the UE contention resolution identity 2, and its subsequent processing process as mentioned above, and will not be repeated here.

c) Until the UE searches for all UE contention resolution identifies, there are no correctly matched UE contention resolution identity, and the maximum transmission times of preamble hasn't been exceeded by the UE, then the UE retransmits message 1.

Figure 32:
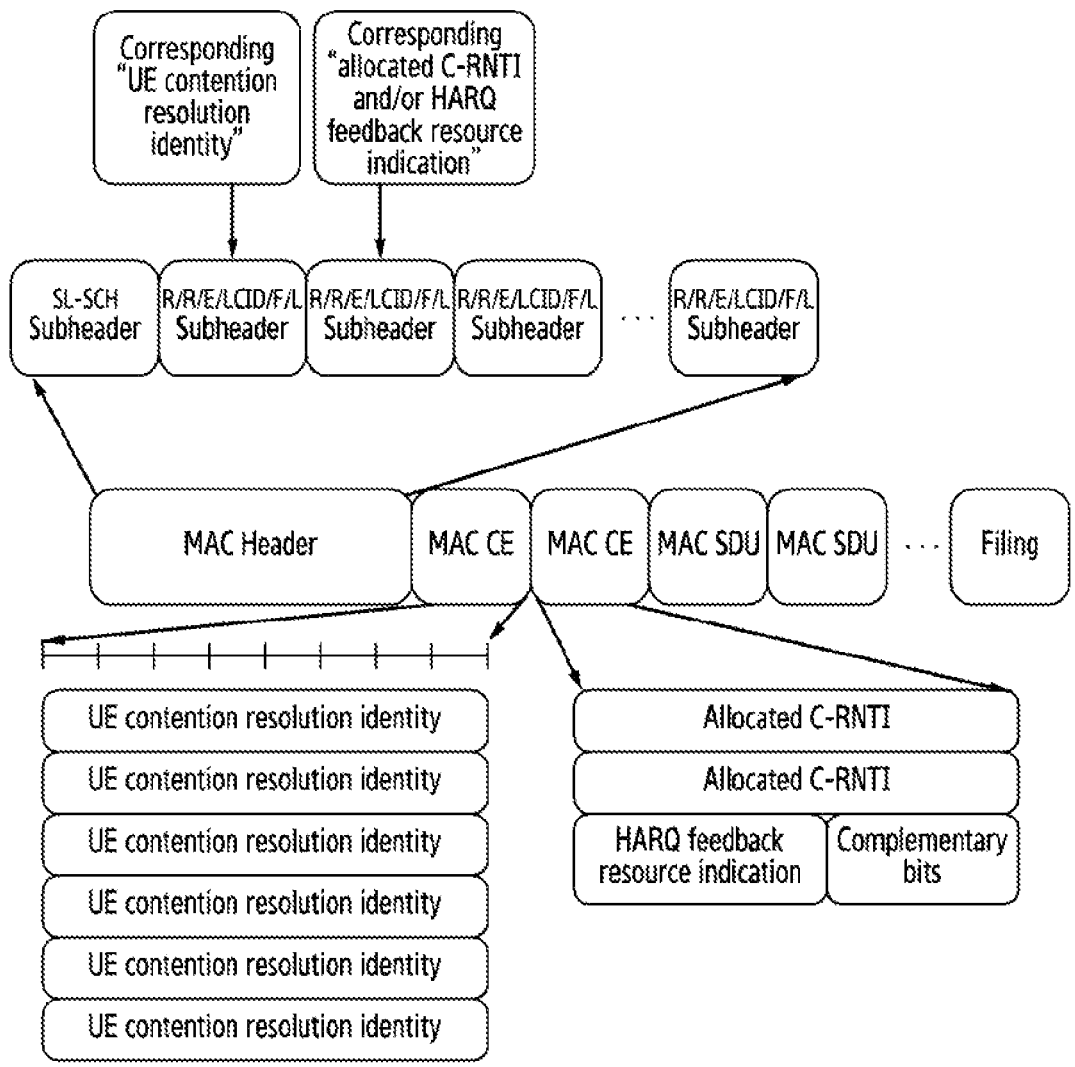
FIG. 32 illustrates an exemplary diagram of UEs respectively reading the contention resolution identity MAC CE and MAC CE of the allocated C-RNTI and the HARQ feedback resource indication according to Embodiment 7 of the present disclosure.

2. When the MAC PDU decoded by the UE includes the MAC CE for indicating the UE contention resolution identity and the MAC CE for indicating the allocated C-RNTI and HARQ feedback resource indication, the UE will compare the UE contention resolution identity (N bits, such as 48 bits in LTE) in the MAC CE with the first N bits (or the last N bits, or the N bits of the specified position) in the CCCH SDU uploaded in message 3 by the UE, as shown in FIG. 32.
  a) If the comparison is positive, the UE may consider its own contention resolution to be successful and continue to read the C-RNTI value as assigned by the base station in the MAC CE indicating the allocated C-RNTI and HARQ feedback resource indication; wherein if the UE does not find the C-RNTI value, or the C-RNTI value is set as a preset value (for example, all 0, or all 1, or a specified value), the UE directly sets the TC-RNTI as a C-RNTI; otherwise the UE sets the read allocated C-RNTI value as its own C-RNTI; and/or, The uplink resource configuration information used for transmitting the feedback information (ACK) of the message 4, i.e., the HARQ feedback resource indication, and the HARQ feedback resource indication includes the uplink resource configuration information; wherein the configuration information of the uplink resource should include at least one of the following types:
  i. Time position
  1) The time position may be a specific time unit index, wherein the time unit position may be, for example, symbol index, slot index, mini slot index, symbol group index, subframe index, half subframe index, radio frame index;
  2) The time position may also be a relative position relative to a known time unit position, such as M time unit positions subsequent to the time unit position where the common search space is located; or M time unit positions subsequent to the time unit position where message 4 is located.
  ii. Frequency domain position
  1) The frequency domain position may be a specific frequency domain unit index position, wherein the frequency domain unit position may be, for example, a subcarrier index, a subcarrier group index, a physical resource block index (PRB index), a physical resource block group index, and the like;
  2) The frequency domain position may also be a relative position relative to a known frequency-domain unit position, such as M frequency-domain unit positions relative to a frequency-domain unit position where the common search space is located; or M frequency-domain unit positions relative to the frequency-domain unit position where message 4 is located;
  iii. Sequence information The sequence information may be sequence index information used by the UE to generate a PUCCH.

Figure 33:
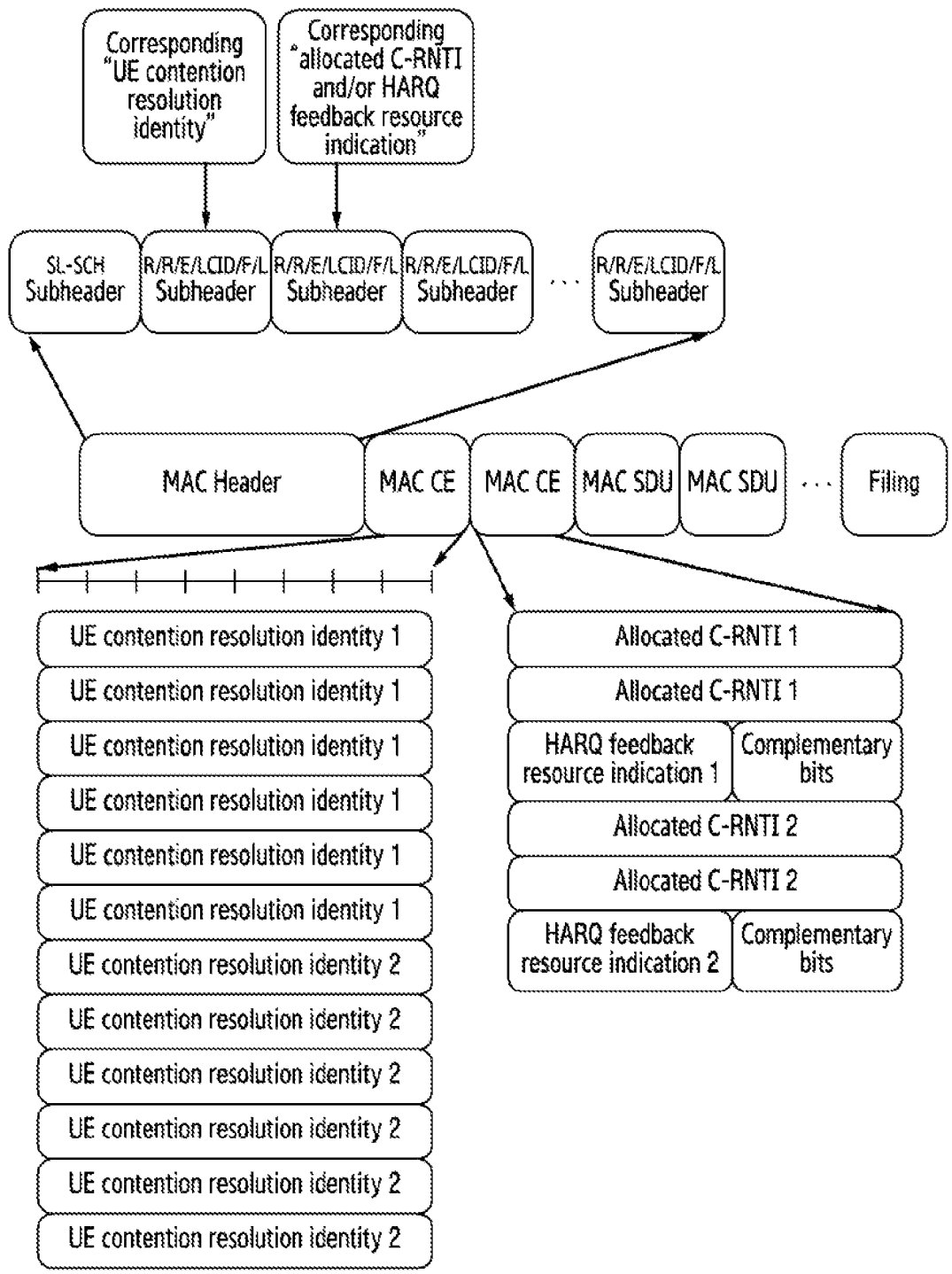
FIG. 33 illustrates an exemplary diagram of UE reading (a plurality of) contention resolution identity MAC CEs and (a plurality of) MAC CEs of the allocated C-RNTI and HARQ feedback resource indication respectively according to Embodiment 7 of the present disclosure.

It should be noted that if time position information and/or frequency domain position information and/or sequence information have been configured in a broadcast message or other downlink channel (as in message 2), in message 4, only the rest of information need to be configured, for example, the uplink time unit position and the frequency domain unit position for transmitting feedback have been configured in the system broadcast information.
  b) If the comparison is negative, the UE continues to compare other positions in the MAC CE that contain the UE contention resolution identity. As shown in FIG. 33, the UE may correctly match with the UE contention resolution identity 2, and its subsequent processing process as mentioned above, and will not be repeated here.
  c) Until the UE searches for all UE contention resolution identifies, there are no correctly matched UE contention resolution identity, and the maximum transmission times of preamble by the UE hasn't been exceeded, then the UE retransmits message 1.
  3. When the MAC PDU decoded by the UE includes the MAC CE for indicating the UE contention resolution identity and the MAC CE for indicating the allocated C-RNTI and HARQ feedback resource indication, as the above-mentioned method, the UE will firstly compare the UE contention resolution identities in the MAC CE. If the comparison is successful, the UE then obtains allocated C-RNTI and/or HARQ feedback resource indication from the MAC SDU. In this case, the MAC SDU may be transmitted to the RRC layer first, after the MAC SDU is decoded by the RRC layer, the allocated C-RNTI and/or HARQ feedback resource indication are transmitted to the MAC layer; the other operation processes of the method are the same as the above two manners, and will not be repeated here. Of course, the method may also be extended to a case where multiple CE contention resolution identities are included in the MAC CE.

Specifically, the above-described several forms of the uplink resource configuration information for transmitting the feedback information (ACK) of the message 4 are not only applied to the transmission of the feedback information of the message 4, but also can be applied to:

The UE may also use the uplink control channel resource configuration information configured in the message 4 to determine the uplink resources for transmitting feedback information (ACK/NACK, acknowledgement and non-acknowledgement) of other received downlink signals (such as PDCCH or PDSCH) before obtaining dedicated configurated uplink resources.

For example, in the message 4, when the uplink resource for the ACK is transmitted is configured to be the Kth time unit after receiving the message 4, then before obtaining the dedicated configurated uplink resource, when the uplink resources for the feedback information (ACK/NACK, acknowledgement and non-acknowledgement) of other received downlink signals (for example, the PDCCH) is transmitted is also the Kth time unit after receiving the downlink signal, One or more types of uplink resource configuration information included in other uplink resource configuration information for transmitting the feedback information (ACK) of the message 4 may also be used.

Even when the UE is in a connected state and obtains the dedicated uplink resource configuration information, it can specify a downlink signal that is scheduled in a common control channel (or common control resource set) or a UE-group control channel (or UE-group control resource set), and it can also use the uplink control channel resource information configured in the message 4 to determine the uplink resource used for transmitting feedback information (ACK/NACK, acknowledgement and non-acknowledgement) of other received downlink signals (such as PDCCH).

For example, in message 4, when the uplink resource for the ACK is transmitted is configured to be the Kth time unit after receiving the message 4, and when the uplink resources for feedback information of the downlink signal (PDSCH) scheduled in the common control channel and/or UE-group control channel is transmitted is also the Kth time unit after receiving the downlink signal (PDSCH).

One or more types of uplink resource configuration information included in other uplink resource configuration information for transmitting the feedback information (ACK) of the message 4 may also be used.

It should be noted that, the foregoing descriptions are merely preferred embodiments and are not intended to limit the present application. Any modification, equivalent replacement, or improvement made within the spirit and principle of the present application should be included within the protection scope of the application.

Figure 34:
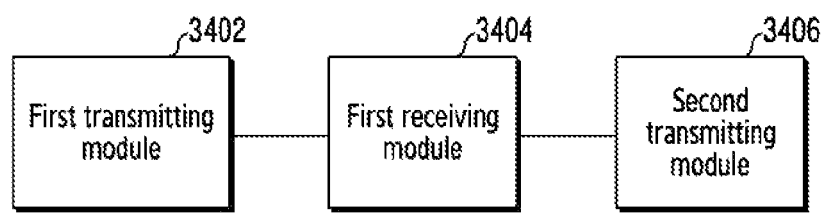
FIG. 34 illustrates a schematic structural diagram of a base station device according to Embodiment 8 of the present disclosure.

An Embodiment 8 of the present disclosure provides a base station device, the specific structure is as shown in FIG. 34, including: a first transmitting module 3402, a first receiving module 3404 and a second transmitting module 3406;

The first transmitting module 3402 is configured to transmit random access response(s) to a plurality of UEs based on the received preambles transmitted by the plurality of UEs.

The first receiving module 3404 is configured to receive Msg3(s) transmitted by the plurality of UEs.

The second transmitting module 3406 is configured to transmit a contention resolution message to the plurality of UEs based on the received Msg3 transmitted by the plurality of UEs.

The random access method provided by the embodiment of the present disclosure comprises: transmitting of RAR(s) to a plurality of UEs, based on received preambles transmitted by the plurality of UEs; receiving of Msg3(s) transmitted by the plurality of UEs, which provides necessary guarantees for subsequent transmitting of a contention resolution message to the plurality of UEs; and transmitting of a contention resolution message to the plurality of UEs, based on the received Msg3 transmitted by the plurality of UEs. The method can enable the base station to transmit the contention resolution message to the plurality of different UEs at the same time. It provides a reliable guarantee for multiple users to access the base station and perform data transmission at the same time based on the received contention resolution message, and effectively avoids the situation that the base station transmits the contention resolution message to only one user and only one user is accessed thereto.

Figure 35:
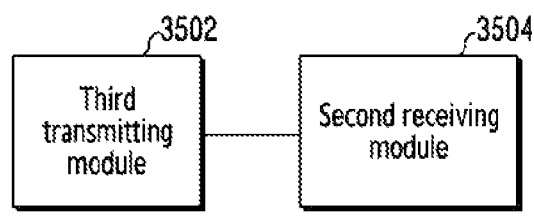
FIG. 35 illustrates a schematic structural diagram of a user equipment according to Embodiment 9 of the present disclosure.

Embodiment 9 of the present disclosure provides a user equipment, and a specific structure is as shown in FIG. 35, which includes: a third transmitting module 3502 and a second receiving module 3504; and a third transmitting module 3502 is configured to transmit a Msg3 to the base station based on the received random access response corresponding to transmitted preamble;

the second receiving module 3504 is configured to receive a contention resolution message from the base station corresponding to the Msg3.

In the embodiment of the present disclosure, a Msg3 is transmitted to the base station, based on received RAR corresponding to a transmitted preamble, which provides necessary guarantees for subsequent the plurality of UEs receiving of the contention resolution message transmitted by the base station; and the contention resolution message corresponding to Msg3 and transmitted by the base station is received. The method can enable the plurality of UEs receive the contention resolution message transmitted by the base station at the same time. It provides a reliable guarantee for multiple users to access the base station and perform data transmission at the same time based on the received contention resolution message, and effectively avoids the situation that only one user can receive the contention resolution message and access to the base station.

It should be understood by those skilled in the art that the present disclosure involves devices for It should be understood by those skilled in the art that the present disclosure involves apparatuses for performing one or more of operations as described in the present disclosure. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It may be understood by those skilled in the art that computer program instructions may be used to realize each block in structure diagrams and/or block diagrams and/or flowcharts as well as a combination of blocks in the structure diagrams and/or block diagrams and/or flowcharts. It may be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It may be understood by those skilled in the art that the operations, methods, steps in the flows, measures and solutions already discussed in the present disclosure may be alternated, changed, combined or deleted. Further, the operations, methods, other steps in the flows, measures and solutions already discussed in the present disclosure may also be alternated, changed, rearranged, decomposed, combined or deleted. Further, prior arts having the operations, methods, the steps in the flows, measures and solutions already discussed in the present disclosure may also be alternated, changed, rearranged, decomposed, combined or deleted.

Those skilled in the art will understand that the appended drawings are only schematic diagrams of a preferred embodiment, and the modules or flows in the appended drawings are not necessarily necessary for the implementation of the present disclosure.

Those skilled in the art will understand that modules in the device in the embodiment can be distributed in the device of the embodiment according to the description of the embodiment, and corresponding changes can also be made in one or more apparatuses different from the embodiment. The modules of the above embodiments can be combined into one module or further divided into multiple sub-modules.

The above-mentioned serial numbers of the present disclosure are for description only and do not represent the advantages and disadvantages of the embodiments.

The above disclosure is only a few specific embodiments of the present disclosure, but the present disclosure is not limited thereto, and any changes that can be imagined by those skilled in the art should fall within the scope of protection of the present disclosure.

The foregoing descriptions are merely preferred embodiments of the present disclosure. It should be noted that, for a person of ordinary skilled in the art, various modifications and embellishments can be made without departing from the principle of the present disclosure. Such modifications and embellishments shall be regarded as falling into the protection scope of the present disclosure.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, system information including first information on a starting resource block (RB) and a number of RBs of an initial uplink bandwidth part (BWP) and second information on a frequency offset of a lowest physical random access channel (PRACH) occasion in a frequency domain with respect to a physical resource block 0 (PRB 0) of the initial uplink BWP;
   identifying a PRACH occasion based on the system information; and
   transmitting, to the base station, a random access preamble in the PRACH occasion.

2. The method of claim 1, wherein the PRACH occasion is one of at least one PRACH occasion in the initial uplink BWP, and the at least one PRACH occasion is identified based on the system information.

3. The method of claim 1, wherein a lowest numbered RB of the initial uplink BWP is identified for the PRACH occasion based on the first information.

4. The method of claim 1, wherein, in case that a plurality of synchronization signal blocks are associated with the PRACH occasion, the random access preamble is one of a plurality of random access preambles corresponding to the plurality of synchronization signal blocks.

5. A method performed by a base station in a wireless communication system, the method comprising:
   transmitting, to a terminal, system information including first information on a starting resource block (RB) and a number of RBs of an initial uplink bandwidth part (BWP) and second information on a frequency offset of a lowest physical random access channel (PRACH) occasion in a frequency domain with respect to a physical resource block 0 (PRB 0) of the initial uplink BWP; and
   receiving, from the terminal, a random access preamble in a PRACH occasion based on the system information.

6. The method of claim 5, wherein the PRACH occasion is one of at least one PRACH occasion in the initial uplink BWP, and the at least one PRACH occasion is identified based on the system information.

7. The method of claim 5, wherein a lowest numbered RB of the initial uplink BWP for the PRACH occasion is based on the first information.

8. The method of claim 5, wherein, in case that a plurality of synchronization signal blocks are associated with the PRACH occasion, the random access preamble is one of a plurality of random access preambles corresponding to the plurality of synchronization signal blocks.

9. A terminal in a wireless communication system, the terminal comprising:
   a transceiver; and
   a controller coupled with the transceiver and configured to:
      receive, from a base station, system information including first information on a starting resource block (RB) and a number of RBs of an initial uplink bandwidth part (BWP) and second information on a frequency offset of a lowest physical random access channel (PRACH) occasion in a frequency domain with respect to a physical resource block 0 (PRB 0) of the initial uplink BWP,
      identify a PRACH occasion based on the system information, and
      transmit, to the base station, a random access preamble in the PRACH occasion.

10. The terminal of claim 9, wherein the PRACH occasion is one of at least one PRACH occasion in the initial uplink BWP, and the at least one PRACH occasion is identified based on the system information.

11. The terminal of claim 9, wherein a lowest numbered RB of the initial uplink BWP is identified for the PRACH occasion based on the first information.

12. The terminal of claim 9, wherein, in case that a plurality of synchronization signal blocks are associated with the PRACH occasion, the random access preamble is one of a plurality of random access preambles corresponding to the plurality of synchronization signal blocks.

13. A base station in a wireless communication system, the base station comprising:
- a transceiver; and
- a controller coupled with the transceiver and configured to:
  - transmit, to a terminal, system information including first information on a starting resource block (RB) and a number of RBs of an initial uplink bandwidth part (BWP) and second information on a frequency offset of a lowest physical random access channel (PRACH) occasion in a frequency domain with respect to a physical resource block 0 (PRB 0) of the initial uplink BWP, and
  - receive, from the terminal, a random access preamble in a PRACH occasion based on the system information.

14. The base station of claim 13, wherein the PRACH occasion is one of at least one PRACH occasion in the initial uplink BWP, and the at least one PRACH occasion is identified based on the system information.

15. The base station of claim 13, wherein a lowest numbered RB of the initial uplink BWP for the PRACH occasion is based on the first information.

16. The base station of claim 13, wherein, in case that a plurality of synchronization signal blocks are associated with the PRACH occasion, the random access preamble is one of a plurality of random access preambles corresponding to the plurality of synchronization signal blocks.

* * * * *